United States Patent
Pontual et al.

(10) Patent No.: US 9,594,482 B2
(45) Date of Patent: Mar. 14, 2017

(54) METHOD AND SYSTEM FOR TRANSFERRING THE DISPLAY OF CONTENT FROM A FIRST DEVICE TO A SECOND DEVICE

(71) Applicant: The DIRECTV Group, Inc., El Segundo, CA (US)

(72) Inventors: Romulo Cruz Pontual, Palos Verdes Estates, CA (US); Earl J. Bonovich, Tinley Park, CA (US); Luke J. Crook, Torrance, CA (US); Timothy W. Frech, Huntington Beach, CA (US); Bo Huang, Redondo Beach, CA (US); Eileen Loh, Rowland Heights, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 316 days.

(21) Appl. No.: 14/246,835

(22) Filed: Apr. 7, 2014

(65) Prior Publication Data

US 2015/0286369 A1 Oct. 8, 2015

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0488* (2013.01); *H04N 21/26258* (2013.01);
(Continued)

(58) Field of Classification Search
CPC .............. G06F 3/04842; G06F 3/0488; H04N 21/26258; H04N 21/4122; H04N 21/6581;
(Continued)

(56) References Cited

U.S. PATENT DOCUMENTS 7,676,193 B2 3/2010 Zilliacus
8,547,414 B2 10/2013 Sheeley
(Continued)

FOREIGN PATENT DOCUMENTS

EP 1505825 A1 2/2005
EP 1796389 A2 6/2007
(Continued)

OTHER PUBLICATIONS

Non-final Office action dated Nov. 10, 2014 in U.S. Appl. No. 14/137,886, filed Dec. 20, 2013 by Charles W. Beeson et al.
(Continued)

*Primary Examiner* — Peiyong Weng
(74) *Attorney, Agent, or Firm* — Harness, Dickey & Pierce, PLC

(57) ABSTRACT

A system and method for moving displayed content between a first device and a second device includes a first display displaying video content having a first content identifier. A first device forms a transfer signal by a gesture or a user interface. The first device communicates a query command signal comprising the first content identifier to a separate web service. The first device receives an asset data signal comprising at least a second content identifier from the web service in response to the query command signal. The second content identifier relates to the first content identifier. One of the first device and the second device requests the video content based on the second identifier and a resume point. The resume point corresponds to a playback position of the video content being displayed at about a time of generating the transfer signal and a second display displays the video content.

14 Claims, 20 Drawing Sheets

(51) Int. Cl.
*G06F 3/0488* (2013.01)
*H04N 21/262* (2011.01)
*H04N 21/41* (2011.01)
*H04N 21/658* (2011.01)
*H04N 21/6587* (2011.01)
*H04N 21/845* (2011.01)

(52) U.S. Cl.
CPC ..... *H04N 21/4122* (2013.01); *H04N 21/6581* (2013.01); *H04N 21/6587* (2013.01); *H04N 21/8455* (2013.01); *H04N 21/8456* (2013.01)

(58) Field of Classification Search
CPC ........... H04N 21/6587; H04N 21/8455; H04N 21/84556
See application file for complete search history.

(56) References Cited

U.S. PATENT DOCUMENTS

| | | |
|---|---|---|
| 2003/0229900 A1 | 12/2003 | Reisman |
| 2006/0101504 A1 | 5/2006 | Aravamudan et al. |
| 2007/0106945 A1 | 5/2007 | Kim |
| 2008/0151126 A1 | 6/2008 | Yu |
| 2009/0153288 A1 | 6/2009 | Hope et al. |
| 2010/0017816 A1 | 1/2010 | Martini et al. |
| 2010/0071014 A1 | 3/2010 | Brown et al. |
| 2010/0333135 A1 | 12/2010 | Lau et al. |
| 2011/0066679 A1* | 3/2011 | Irvine .............. H04N 21/43615 709/203 |
| 2011/0078743 A1 | 3/2011 | Kim et al. |
| 2011/0283311 A1 | 11/2011 | Luong |
| 2011/0320626 A1 | 12/2011 | Wong et al. |
| 2012/0060179 A1 | 3/2012 | Lyu |
| 2012/0062471 A1 | 3/2012 | Poulidis et al. |
| 2012/0303834 A1* | 11/2012 | Adam ................. H04L 65/4084 709/231 |
| 2013/0054742 A1 | 2/2013 | Tsuji et al. |
| 2014/0298414 A1 | 10/2014 | Alsina et al. |

FOREIGN PATENT DOCUMENTS

| | | |
|---|---|---|
| EP | 2169949 A1 | 3/2010 |
| EP | 2677757 A2 | 12/2013 |
| WO | 98/59479 A1 | 12/1998 |
| WO | 99/34564 A1 | 7/1999 |
| WO | 01/47248 A2 | 6/2001 |
| WO | 2011/091296 A1 | 7/2011 |
| WO | WO 2011091296 A1 * | 7/2011 ......... H04L 65/4084 |

OTHER PUBLICATIONS

International Search Report and Written Opinion dated Jun. 19, 2015 in International Application No. PCT/US2015/023580 filed Mar. 31, 2015 by Romulo Cruz Pontual et al.

Sodagar, Iraj; "The MPEG-DASH Standard for Multimedia Streaming Over the Internet"; Multimedia, IEEE, vol. 18, Issue 4; Apr. 2011; pp. 62-67; ISSN: 1070-986X.

* cited by examiner

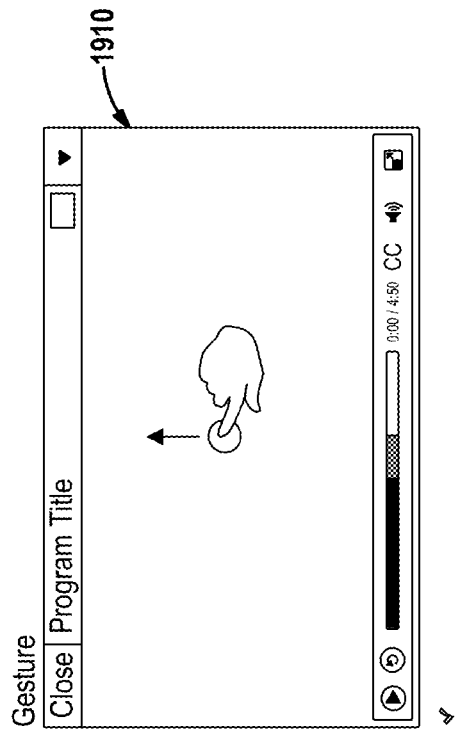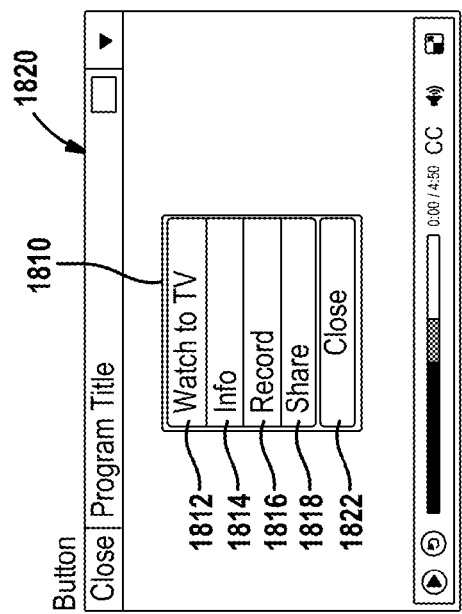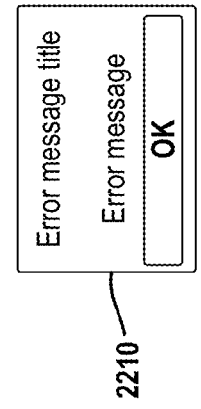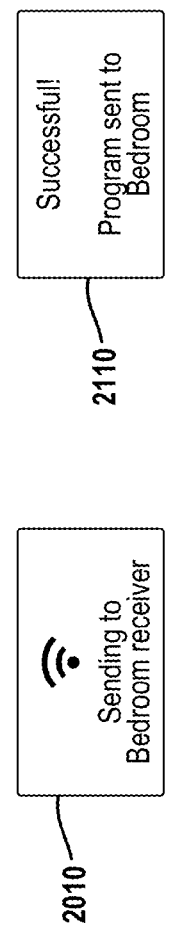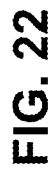
FIG. 18
FIG. 19
FIG. 20
FIG. 21
FIG. 22

METHOD AND SYSTEM FOR TRANSFERRING THE DISPLAY OF CONTENT FROM A FIRST DEVICE TO A SECOND DEVICE

TECHNICAL FIELD

The present disclosure relates generally a television programming delivery system, and, more specifically, to using a second screen device to enhance a user experience by allowing content to be moved from a first device to a second device.

BACKGROUND

The statements in this section merely provide background information related to the present disclosure and may not constitute prior art.

Television content providers are continually increasing the amount of television content provided. In addition to the actual television programming content, television providers also provide limited information regarding the content such as a brief description, running time, parental ratings, and the like. The limited data may be metadata delivered with the content or guide data and may be delivered directly to the set top box. Content users increasingly desire further information relative to the content.

Mobile devices such as touch-screen mobile devices have also increased in popularity. Such devices are typically connectable to the internet to obtain content from various sources. Mobile touch-screen devices include the IPAD® by APPLE® and various ANDROID® operating system devices. The mobile devices are capable of receiving Internet Protocol content including streamed videos.

SUMMARY

The present disclosure provides a system and method for using a second screen device to play content being displayed on a screen display associated with a set top box or displaying content from a display associated with a set top box on a second screen device.

In one aspect of the disclosure, a method includes displaying video content on a first display. The video content has a first content identifier associated therewith. The method further includes forming a transfer signal at the first device by generating a gesture or selecting a selector of a user interface at the first device and determining a resume point. The resume point corresponds to a playback position of the video content being displayed at about a time of generating the transfer signal. The method further includes forming a query command signal comprising the first content identifier in response to the transfer signal in the first device, communicating the query command signal from the first device to a web service separate from the first device with the first content identifier and receiving an asset data signal comprising at least a second content identifier at the first device from the web service in response to the query command signal. The second content identifier is related to the first content identifier. The method further includes requesting the video content based on the second identifier and the resume point and displaying the video content on a second display.

In a further aspect of the disclosure, a system for moving displayed content between a first device and a second device includes a first display displaying video content having a first content identifier. A first device forms a transfer signal by a gesture or a user interface. The first device communicates a query command signal comprising the first content identifier to a separate web service. The first device receives an asset data signal comprising at least a second content identifier from the web service in response to the query command signal. The second content identifier relates to the first content identifier. One the first device and the second device requests the video content based on the second identifier and a resume point. The resume point corresponds to a playback position of the video content being displayed at about a time of generating the transfer signal and a second display displays the video content.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 18 is a screen display of a user interface for initiating a flick procedure.

FIG. 19 is a screen display illustrating a gesture procedure for initiating the flick function.

FIG. 20 is a screen display illustrating a status for sending content to a set top box.

FIG. 21 is a screen display of a "successful" message.

FIG. 22 is a screen display of an "unsuccessful" message when initiating flick.

DETAILED DESCRIPTION

Figure 1:
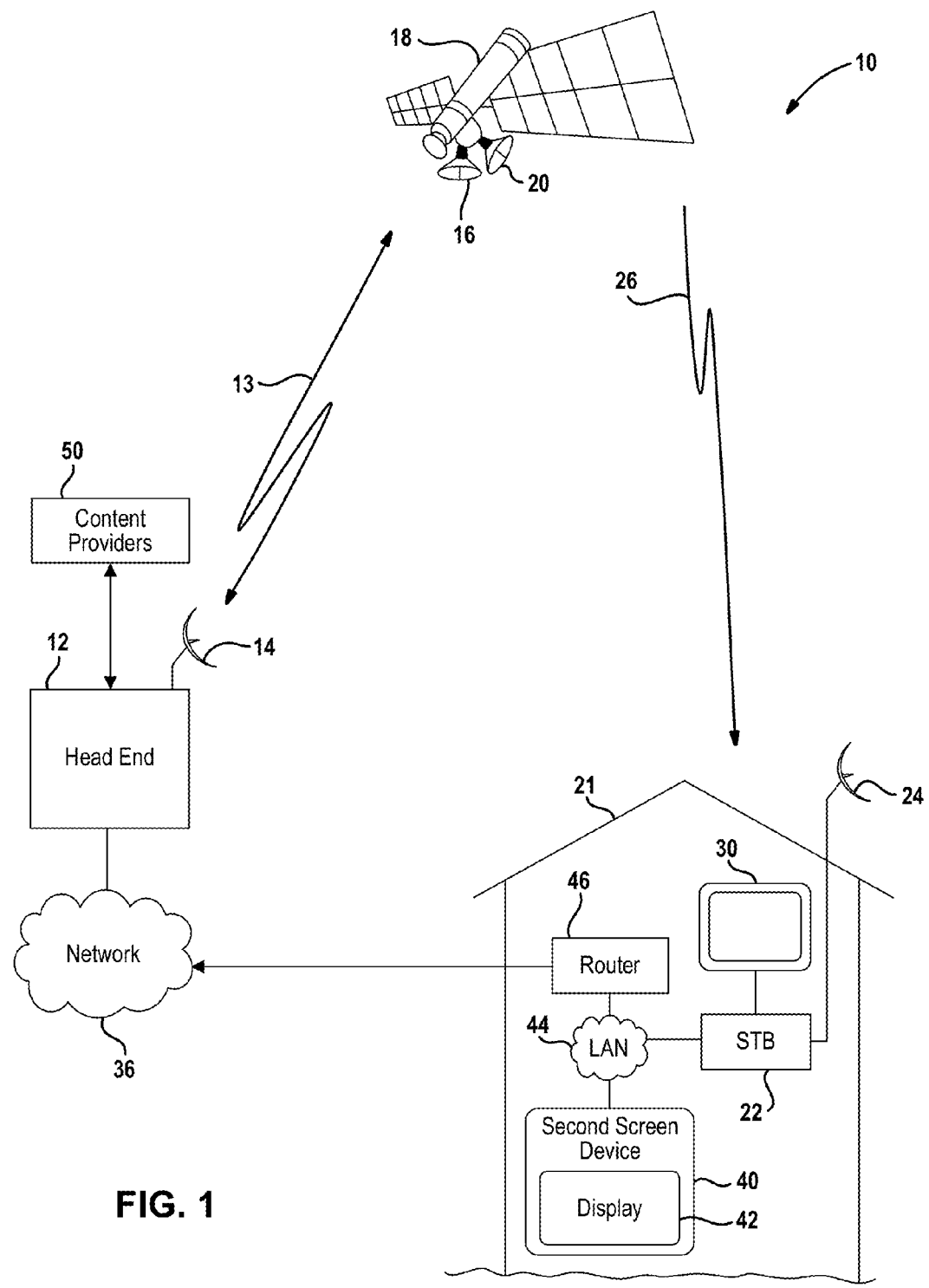
FIG. 1 is a block diagrammatic view of a communication system for content playback and delivery according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to programs, data, information, movies, assets, video data, etc., however, it will be readily apparent to persons of ordinary skill in the art that these terms are substantially equivalent in reference to the example systems and/or methods disclosed herein. As used herein, the term content, title or program will be used to refer to a movie or television program name.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home. A set top box (STB) 22 is an example of a stationary receiving device or system that may be placed at different locations relative to the display or television. The set top box 22 is in communication with an antenna 24. The antenna 24 receives downlink signals 26 from the transmitting antenna 20 of the satellite 18.

The head end 12 may communicate various content, program guide data or other data through the satellite 18. For example, television channels from a broadcast network or channels generated locally at the head end 12 may be communicated through the satellite. The set top box 22 may receive the content and data. A plurality of set top boxes 22 may be provided in a system. The plurality of set top boxes 22 may be located within a single building or household.

The set top box or boxes 22 each have a display 30 associated therewith. The display 30 may be a television or monitor used for displaying video images and providing an audio output.

A network 36 may be used to connect the head end 12 with various devices including the set top box 22. The network 36 may be one type of network or multiple types of networks. The network 36 may, for example, be a public switch to telephone network, the internet, a mobile telephone network or other type of network. The head end 12 may simultaneously communicate streaming channel signals corresponding to all or a limited set of the channels from the head end 12. The streaming channels are communicated through the head end 12. Video-on-demand content may also be streamed from the head end. Various formats may be used in streaming, including but not limited to MPEG Dynamic Adaptive Streaming over HTTP (MPEG-DASH) or simply (DASH).

The system 10 may also include a second screen device 40. The second screen device 40 may be various types of devices including a mobile phone, a laptop, or a touch screen device, tablet device or computer. The second screen device 40 may have a screen display 42 used for displaying various types of information as will be set forth further below. The second screen device 40 is referred to as such because it is used together with the display 30 associated with the set top box 22. The second screen device 40 may be referred to as a mobile device. The second screen device 40 may receive streaming content from the head end 12 in the DASH format or other formats.

A local area network (LAN) 44 may also be incorporated into the system. The local area network 44 may be in communication with the set top box 22 and the second screen device 40. The local area network 44 may be a wireless local area network.

The local area network 44 may also include a router 46. The router 46 may allow the devices within the local area network 44 to inter-communicate. In this example, the local area network 44 may allow the second screen device 40 and the set top box 22 to communicate. The set top box 22 and the second screen device 40 may exchange data signals to allow one device to stream content that is displayed on the other device. The router 46 may also communicate with the network 36.

The local area network 44 may be used to communicate the streaming channels and content to the set top box 22 and second screen device 40 that originate from the head end 12. The router 46 may be in communication with the head end 12 through the network 12.

The head end 12 may be in communication with one or more content providers 50. The content providers provide various content for distribution to the various user devices. The content providers may provide content in various ways including satellite, DVD, an electronic file or a tape. Content providers may provide content that is available on request or "on-demand." The on-demand content is not broadcasted to multiple devices but rather communicated in an individual stream.

Security of assets broadcast via the satellite 18 or communicated through the network 36 may be established by applying encryption and decryption to assets or content during content processing and/or during broadcast (i.e., broadcast encryption). For example, an asset can be encrypted based upon a control word (CW) known to the content processing system 102 and known to the user devices such as the set top box 22 and the second screen device 40 that are authorized to view and/or playback the asset. In the illustrated example the head end 12, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 22 and 40 via the satellite 18. The user devices authorized to view and/or playback the broadcast encrypted asset will be able to correctly determine the CW by computing a cryptographic hash of the contents of the received CWP. If the user device is not authorized, the user device 22 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

An electronic token (eToken) system may also be used to provide security to streaming content communicated through the network regardless of whether the content is destined for the set top box 22 or the second screen device 40. The electronic token system may be used instead of the CWP described above.

Figure 2:
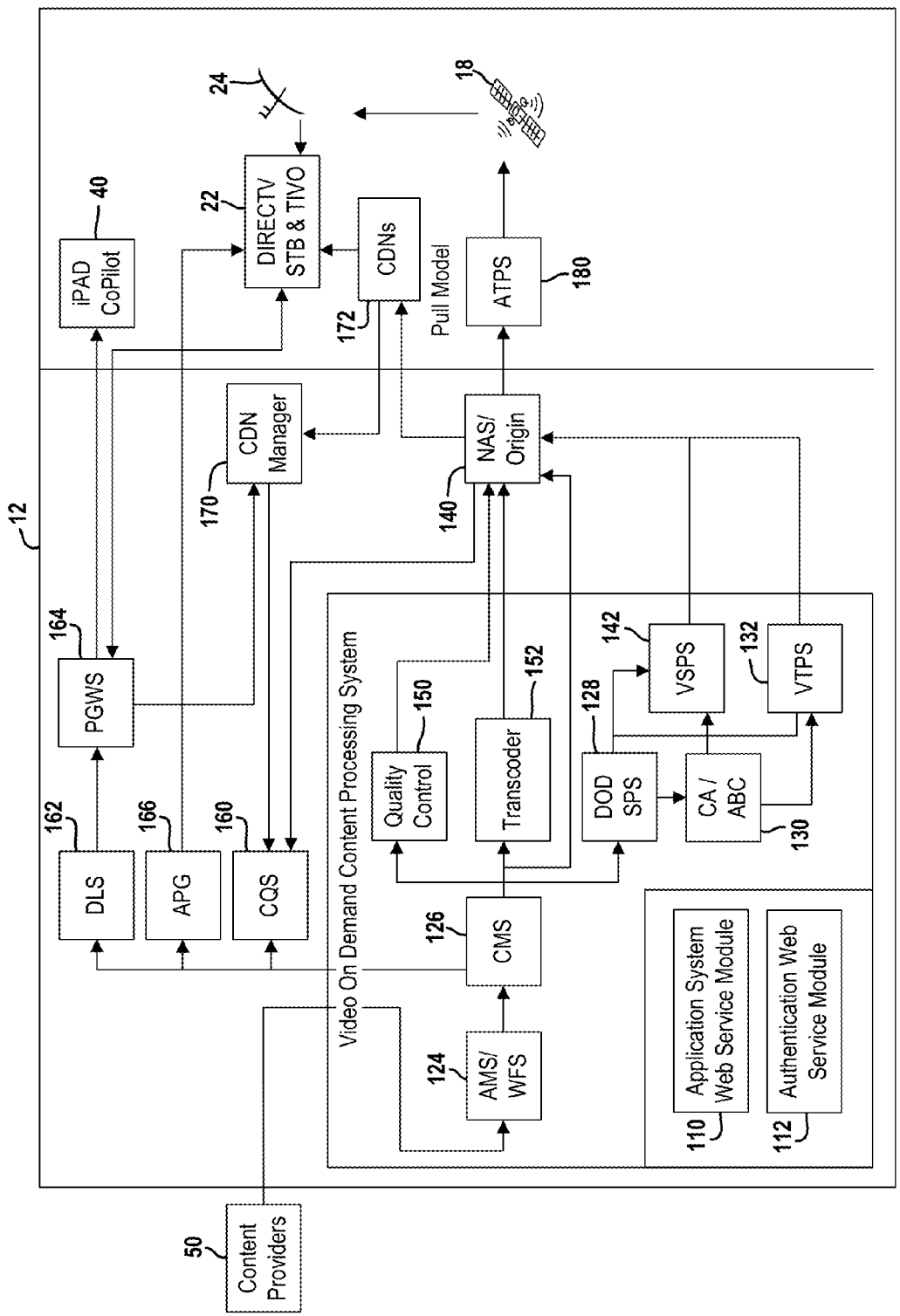
FIG. 2 is a high-level block diagrammatic view of the head end of FIG. 1.

Referring now to FIG. 2, the head end 12 is illustrated in further detail. The head end 12 may include various modules that are interconnected. In FIG. 1 the head end 12 is illustrated as being within one facility. However, various numbers of facilities with different numbers of modules may be used in an actual implementation.

The head end 12 may include an application system web service module 110. The application system web service module 110 may be a configuration service or server that provides site definitions, host uniform research locators and application settings. The application system web service module 110 may be used to call other web services such as an authentication web service module 112.

The authentication web service 112 may act as a look-up service to authenticate a user device such as the set top box or the second screen device. This may be done through the use of electronic tokens. The authentication web service module 112 may also be used as a setup service that is used to setup the second screen device based on various user parameters. Such user parameters may include the type of device and the services subscribed to. Some services may be selectively provided to user devices for a fee. The head end may also include a video on-demand content processing system 120. The content providers provide content to the video on-demand content processing system 120.

The video on-demand content processing system 120 includes an asset management system (AMS) or workflow system (WFS) 124. The workflow system 124 is used to control the format conversion of the received content. The workflow management system 124 may also be used to control the ingestion of the received content. The content received at the workflow system may be in a digital format. The workflow system 124 may also receive metadata associated with the content.

The workflow system 124 is in communication with a content management system (CMS) 126. The content management system 126 manages all content profiling, transcoding and processing of content. The content management system 126 distinguishes between content targeted for set top box and content that is to be streamed in various manners including through the internet. The content management system 126 creates a unique identifier for each of the versions of the content. The content management system 126 may also set flags to send to the set top box to identify which versions are available. Such versions may include but are not limited to streaming versions, fast loading versions and full resolution versions. One streaming version that may be available is an MPEG-dynamic adaptive streaming through HTTP (DASH). Flags may also be set for DASH content. The identifiers provided for each of the versions may be referred to as a content identifier or material identifier.

The content management system 126 is in communication with a schedule program associated data (PAD) server 128. The schedule PAD server (SPS) 128 is used to generate program associated data that is communicated to the conditional access system 130. The conditional access system 130 may be used to generate control words and control word packets that are ultimately provided to a video transport processing system (VTPS) 132. The video transport processing system 132 may encode the packets containing the content. The encoder may encode the data into various transport streams such as the DIRECTV® proprietary formats or industry standard formats. The encoded data is then packetized into a stream of data packets having a header to facilitate identification of the contents. Various types of encryption, such as the well-known Advanced Encryption Standard (AES) may be used. In one example, only the payload portions of the packets are encrypted that allows the user devices to filter, route and/or sort the received broadcast encrypted data packets without having first to encrypt the encrypted data packets.

The data packets from the video transport processing system 132 are stored in a network area storage (NAS) 140. Folders for the different versions of a content may be stored therein. The network area storage 140 may also have an "origin" server attached thereto for controlling access to the NAS.

Referring back to the schedule PAD server 128, content may also be broken into chunks or segments using the DASH streaming standard. The SPS 128 may communicate content to the video stream processing system (VSPS) 142 that divides the content into segments. The video stream processing system 142 may generate a media presentation description or manifest file that describes the available content, its various alternatives and the URL addresses or segment paths for each of the segments or chunks. The segments may be referred to as "chunks." To playback the content file, ultimately the media presentation description (MPD) file is used by the user device. The MPD may also be referred to as a manifest. The VSPS 142 also encrypts the content using the conditional access encryption key provided by the conditional access system 130. Watermarking information and closed captioning data may also be included. Metadata may also be generated at the VSPS 142 to allow for trick play. A constant bitrate and variable bitrates may also be accommodated in the VSPS 142. The manifest file and different versions of the content may all be stored within the network area storage 140.

The content management system 126 may also be in communication with a quality control system 150 and a transcoder system 152*d*. Both the quality control system 150 and the transcoder system 15 are in communication with the network area storage 140. The quality control system 150 is used to generate content profiles and check to determine whether the content is a predetermined format such as the DIRECTV® format. The transcoder system 152 transcodes the content into various formats including progressive formats that include segments or chunks.)

Different device may require differently formatted content. The content management system 126 is also in communication with a content query system (CQS) 160. The content query system tags inventory and publishes data to the DIRECTV® listing system (DLS) 162. The listing system 162 may provide metadata to the program guide web service 164. The web service may be implemented in a server. The program guide web service (PGWS) 164 provides a web or internet based program guide system. An advanced program guide system (APG) 166 provides a system for distributing program guide data to the various fixed user devices through the satellite. The content management system 126 publishes metadata and content inventory data to the listing service 162. Video on-demand information that is available to mobile and personal computer clients is stored within the program guide web service 164. The program guide web service 164 may provide a flag that indicates if a progressive download file, such as a DASH streaming file is available for the set top box this allows a mechanism for an error to appear if a "flick" is performed from a mobile user device to the set top box or other fixed user device to indicate that the content is not available for this procedure. This will be further described below. The program guide web service 164 provides various material ID's to the user devices such as mobile devices and set top boxes. The program guide web service 164 may also provide a look up service so that one material ID may be used to obtain another material ID. Material identifiers may also be referred to as content identifiers. Content identifiers may be used to identify the format of content. Thus, one on-demand file may have a number of content identifiers corresponding to each format. The program guide service may pass a material ID, a content delivery network URL or path, a content delivery network token and a relative path to the set top box. Updated tokens may also be passed to the set top box when an electronic token expires. Thus, the program guide web service 164 may be in communication with the authentication web service module 112. A connection is not illustrated to simplify the drawing. Both the second screen device 40 and the set top box 22 may be in communication with the program guide web service 164.

The program guide web service 164 is also in communication with a content delivery network (CDN) manager 170. The content delivery network manager 170 is in communication with the content query system 160 and the program guide web service 170. The content delivery network manager 170 may provide data to the program guide web service 164 regarding the proper path or URL for a desired content.

One or more content delivery networks 172 are used to communicate content through the network 36 illustrated in FIG. 1. Only one CDN 172 is shown for simplicity. The content delivery networks 172 may provide segmented content and/or streaming content to the set top box 22 and the second screen device 40. The content delivery networks 172 may be provided within the head end or may be an outside service provided by a third party vendor. The content delivery network 172 receives content from the network area storage that may also be within the head end 12.

An advance transport processing system (ATPS) 180 may be used to format and provide signals to the satellite 18 from the network area storage 140. The satellite signals are received through the antenna 24 that is coupled to the set top box 22. The advance transport processing system 180 may multiplex various signals and provide an RF switching system for communicating the signals to the satellite 18.

Figure 3:
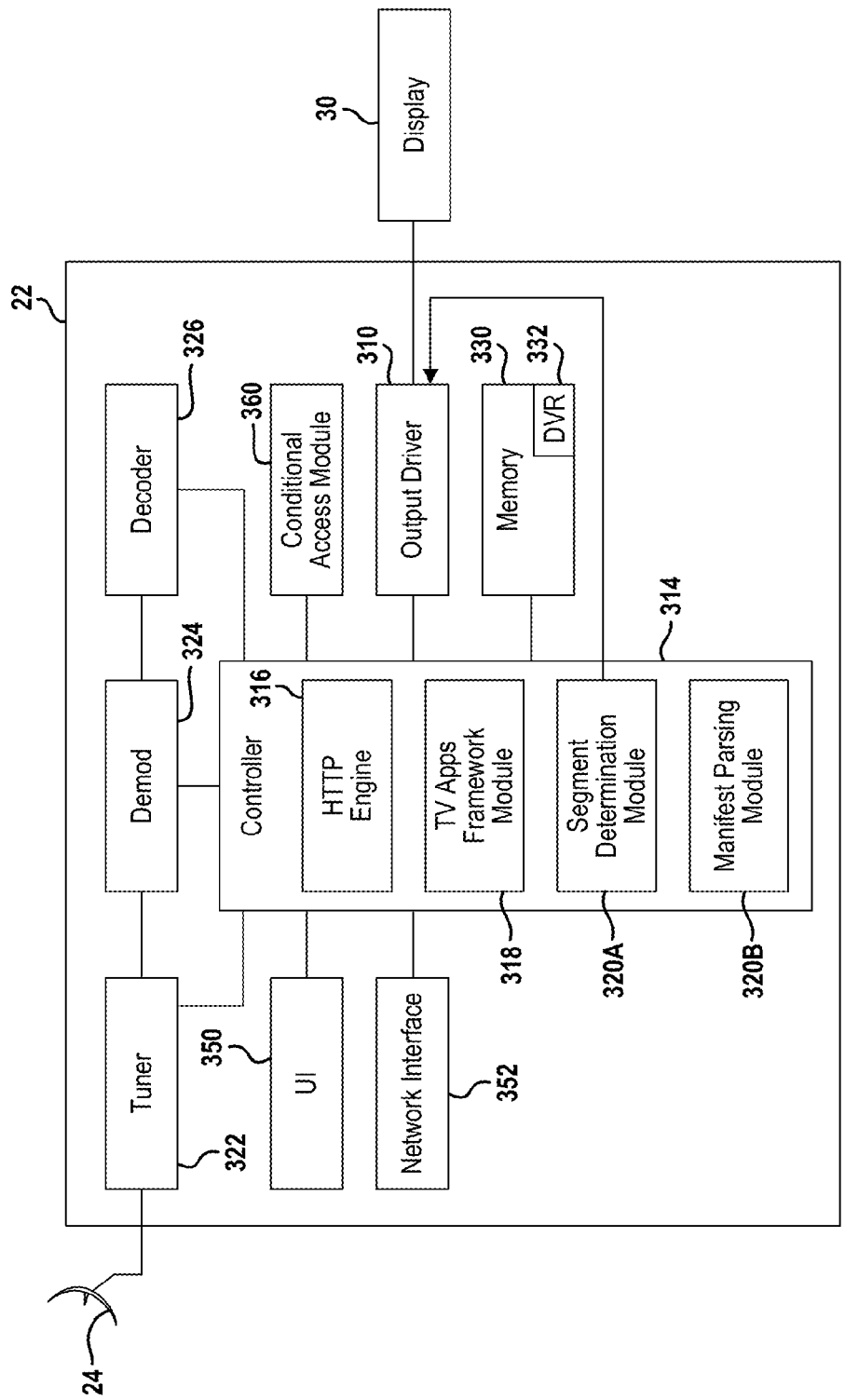
FIG. 3 is a high-level block diagrammatic view of the set top box of FIG. 1.

Referring now to FIG. 3, the set top box 22 is illustrated in further detail. Although, a particular configuration of the set top box 22 is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for different orbital slots may be used. In a cable system no antenna may be used. Rather, a connector to a cable may be used. The set top box 22, as described above, is coupled to a display 30. The display 30 may have an output driver 310 within the set top box 22.

A controller 314 may be a general processor such as a microprocessor that cooperates with control software. The controller 314 may be used to coordinate and control the various functions of the set top box 22. These functions may include a tuner 322, a demodulator 324, a decoder 326 such as a forward error correction decoder and any buffer or other functions.

The tuner 322 receives the signal or data from the individual channel. The tuner 322 may receive data from a satellite or a terrestrial source such as a cable. The tuner 322 may receive television programming content, program guide data or other types of data. The tuner 322 may be tuned to a particular channel under the control of the controller 314 for recording or displaying a particular channel or content.

The demodulator 324 demodulates the signal or data to form a demodulated signal or data. The decoder 326 decodes the demodulated signal to form decoded data or a decoded signal. The controller 314 may be similar to that found in current DIRECTV® set top boxes which uses a chip-based multifunctional controller. Although only one tuner 322, one demodulator 324 and one decoder 326 are illustrated, multiple tuners, demodulators and decoders multiple tunes, demodulators and decoders may be provided within a single set top box 22.

The controller 314 may also include a hypertext transfer protocol (HTTP) engine module 316 and a television application framework module 318. The HTTP engine module 316 (HTTP engine) is used to receive commands through the local area network 44. The commands in this example are received from the second screen device 40. The HTTP engine module 316 receives the commands that are acted upon by the controller 314. When the HTTP signals are received at the HTTP engine 316 are remote control commands, the HTTP engine exposes the underlying commands from the signal which are acted upon by the controller 314. The remote control commands may be the same commands that are used by a remote control device that are used to control the set top box 22. Other commands may be received at the HTTP engine 316 such as a tune command to tune a tune the tuner 322 to a particular channel for viewing or recording or storing within the set top box 322. Other commands that may be received by the controller 314 and thus the HTTP engine 316 include signals that allow a flick and pluck to be performed. "Flick" is the ability to communicate the displayed point of content from a source device such as the second screen device 40 to a receiving device such as the set top box 22 to allow continued viewing (streaming or playback) on the set top box or receiving device. As will be described in more detail below, the source device, such as the second screen device 40, may initiate a command in response to a user interface or gesturing. A content identifier is ultimately communicated to the set top box as well as a resume point to allow the set top box to resume playing the content. The content may be resumed from the beginning of a resume segment determined based on the resume point. "Pluck" is the ability to communicate a command from a source and initiate the content display point on the requested device for continued viewing on the requested device. This, for example, allows the second screen device 40 to play the content being displayed on the set top box from or near a resume point. Again, the "pluck" action will be described in more detail below.

The HTTP engine 316 may also be used for receiving content in an HTTP format. One suitable format is MPEG Dynamic Adaptive Streaming over HTTP (MPEG-DASH) format.

The television (TV) application framework module 318 is used for launching various applications such as a widget that is viewable on the television. The widgets may be displayed on top of the video on the display 30. In this particular example, the television application framework module 318 may be used to communicate with the head end 12 illustrated in FIG. 1. The TV application framework module 318 may request data for user accounts, program information, sports data, or the like from the head end. The TV application framework module 318 may receive the requested data and display the data in a particular format or position on the display 20.

A segment determination module 320A may also be included within the controller 314. The segment determination module 320A may request a manifest file and based upon the resume point, determine the resume segment that contains the resume point. The manifest parsing module 320B parses the MRD or manifest to obtain the data corresponding to each segment so that the proper segment is determined. The manifest parsing module 320B also obtains the URL or path of the resume segment (and subsequent segments containing the resume point and for subsequent segments so that the content from the segment may be obtained. Upon playback, the content is resumed from the beginning of the first segment retrieved. This, again, corresponds to the segment containing the resume point.

The controller 314 is in communication with a memory 330. The memory 330 is illustrated as a single box. The memory 330 may actually be a plurality of different types of memory including the hard drive, a flash drive and various other types of memory. The memory 330 may be other types of memory or sections of different types of memory. The memory 330 may be non-volatile memory or volatile memory.

The memory 330 may include storage for various operational data collected during operation of the set top box 22. For example, the memory 330 may store various types of data including set top box playlist data that has the playlist for content saved within the memory 330. Another type of data stored in the memory is the favorite settings for the set top box 22. Another type of data in the memory 330 may include the channels subscription data, the blocked channels, adult channels, rating limits set by the set top box 22, current set top box language, prioritizer data, TV resolution data, to do list data, the conditional access module identifier, time zone data, time of day daylight savings, status data, aspect ratio data, viewing hours data, quick tune list and a zip code.

The memory 330 may also store the advanced program guide data. The memory 330 may store program guide data that is received at the head end. The program guide data may include amounts of data including two or more weeks' worth of program guide data. The program guide data may be communicated to the set top box 22 in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier, producer data and event type. The data may also include various other settings.

The memory 330 may also include a digital video recorder 332. The digital video recorder 332 may be a hard drive, flash drive, or other memory device. A record of the content stored in the digital video recorder is a playlist. The playlist may be stored in the DVR 332 or other parts of memory 330. The memory 330 may store eTokens therein.

The set top box 22 may also include a user interface 350. The user interface 350 may be various types of user interfaces such as a keyboard, push buttons, a touch screen, a voice activated interface or the like. The user interface 350 may be used to select a channel, select various information, change the volume, change the display appearance, or other functions. The user interface 350 may also be used for selecting recommendation and providing feedback for recommendations as will be described below.

A network interface 352 may be included within the set top box 22 to communicate various data through the networks 36/44 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The set top box 22 may also include a conditional access module 360. The conditional access module 360 prevents unauthorized reception of the television signals through the antenna 24. The conditional access module 360 may use a cryptographic hash to authorize the use and display of the received signals.

Figure 4:
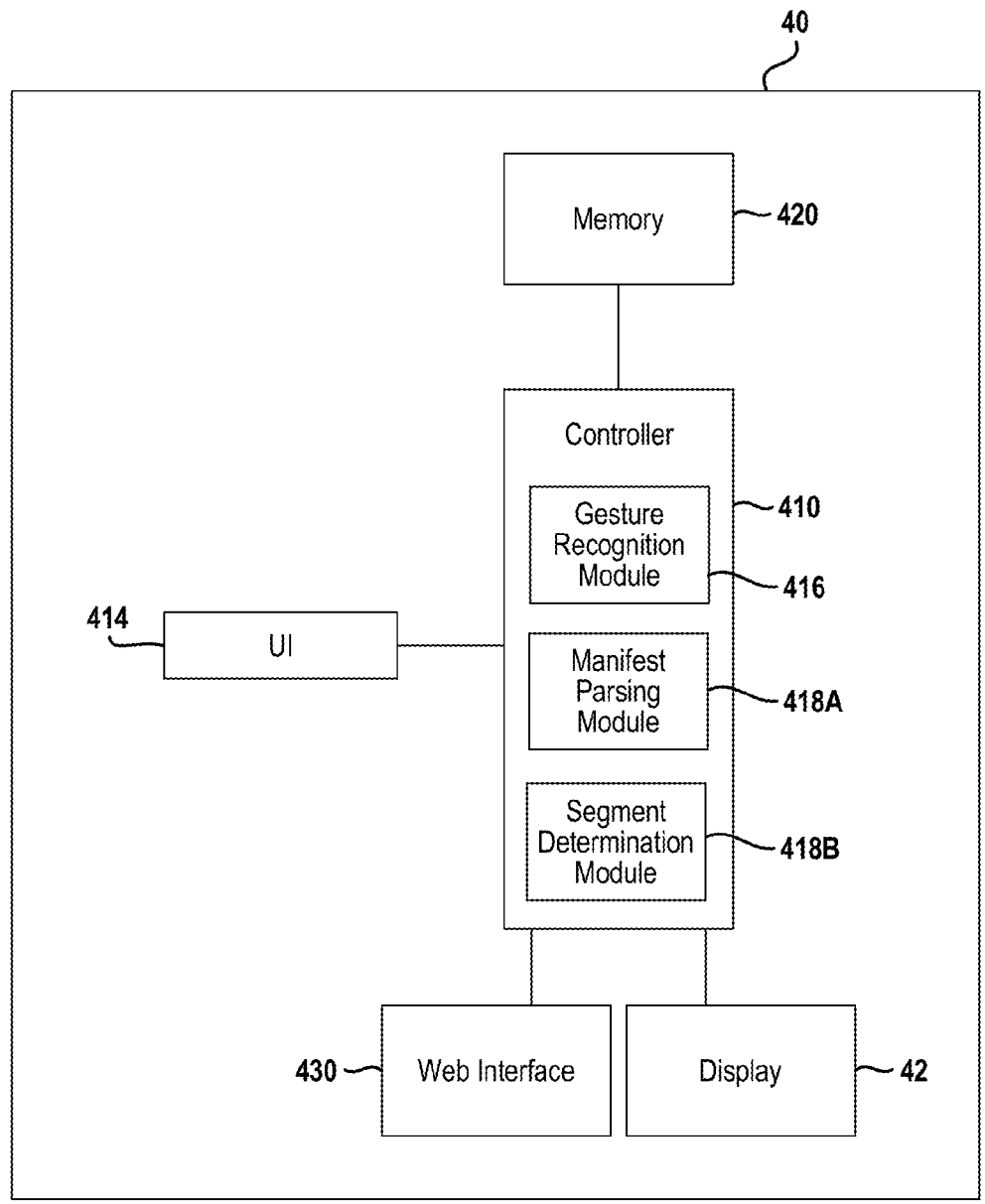
FIG. 4 is a high-level block diagrammatic view of a second screen device of FIG. 1.

Referring now to FIG. 4, a block diagrammatic view of the second screen device 40 illustrated in FIG. 1 is set forth. As mentioned above, the second screen device 40 is a user device that includes a display or screen. The second screen device 40 may be a tablet computer, a laptop computer, a mobile phone, or the like. One example of such a device is an IPAD® by APPLE®. The second screen device 40 includes a controller 410. The controller 410 may include a central processing unit that is microprocessor-based. The controller 410 performs various functions including controlling a screen display 42. The controller 410 is also in communication with a user interface 414. The user interface 414 may be one or a combination of different types of user interfaces depending upon the device. Many tablet computers include push-buttons or touch screens or both. Keyboards, styluses and other types of input devices may also be used as a user interface 414 of the second-screen device. The user interface 414 is used to provide various inputs and responses to elements displayed on the screen display 42. When the user interface is a touch screen or touch display, the screen display 42 and the user interface 414 may be one in the same. More than one user interface 414 may be incorporated into the second screen device 40.

The controller 410 may include a gesture recognition module 416. A gesture originates from a bodily motion associated with a touch screen. Gestures are interpreted by a mathematical algorithm within the gesture recognition module 416. Various types of gestures may perform various functions depending upon the screen display. In the present example, a media player may be sized by "pinching" or "spreading" the media player window. Touching, sliding or other gestures may be performed with the different meanings based on the screens displayed and the context. Other gestures, such as a swipe gesture, also move or initiate a particular procedure. Touching the touch pad in a particular location may activate a menu. In the present example, a combination gesture such as a touch followed by an upward swipe motion on the screen display may communicate a tune signal to the set top box. The gesture recognition module 416 mathematically recognizes a touching or a plurality of touchings of the touch screen and initiates a function performed by the controller 410 in conjunction with other modules within the second screen device 40.

The controller 410 may also include a manifest parsing module 418A and a segment determination module 418B. Depending on whether a flick or a pluck is performed, the manifest parsing module 418A may act in a similar way to that described above in FIG. 3 with respect to the set top box. The segment determination module 418B may also determine a segment and a similar manner to that described above with respect to the set top box.

A memory 420 is also in communication with the controller 410. The memory 420 may include different types of memory that store different types of data. The memory 420 may store operating software for the device, operating data, user settings, video, music, documents, and applications. The applications may perform various functions, including an application for communicating with a set top box 22 illustrated in FIGS. 1 and 3 and obtaining data from the set top box and data services center. The application may allow the second screen device 40 to communicate directly with the head end 12. A web interface 430 may be used for communicating with the head end 12 and the set top box 22. The web interface 430 may allow a connection to the network 36 and network 44. The web interface 430 may allow communication through a wireless network such as a local area network, a wide area network or a mobile or cellular network. The memory 420 may store an eToken therein.

In the present example, the controller 410 allows the user to customize the screen display 42 to display various types of data in a user-controlled format. That is, the screen display 42 may be customized to display the data desired by the user. The second screen device 40 may act as an extension of the set top box 22 and display 30 as illustrated in FIG. 1 to display additional information about the programming shown through the set top box 22. The data is received through the web interface 430.

Figure 5:
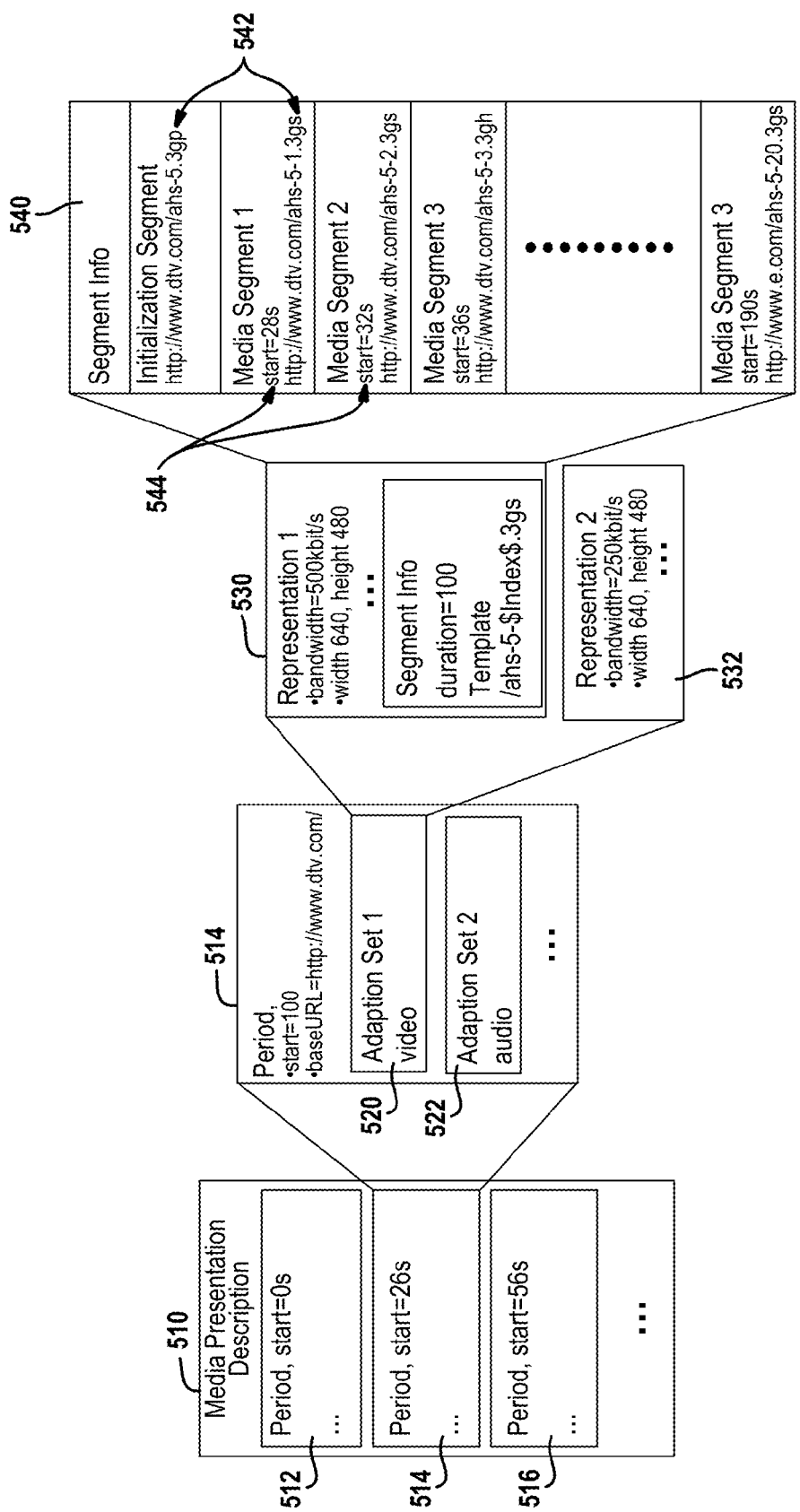
FIG. 5 is a block diagrammatic screen display of a manifest file.

Referring now to FIG. 5, a representation of a manifest file 510 is set forth. The manifest file 510 may be referred to as a media presentation description (MPD) or a manifest. The media presentation description may have a plurality of presentation periods 512, 514 and 516. Each period has a predetermined interval. Each interval may correspond to a predetermined segment such as 28 seconds in this example.

Each period may have a plurality of adaptation sets 520, 522. In this example, adaptation set 520 corresponds to video and adaptation set two 522 corresponds to audio. Each adaptation set 520/522 may include a representation 530/532. The representation 530/532 may include a bandwidth, a width and height (in pixels). In this example, the bandwidth is 500 kbps in representation one and the width is 640 pixels and the height is for 180 pixels. A second representation 532 may be formed for the same. In this example, a second bandwidth of 250 kbps is supported for the second representation of the adaptation set one 520.

Each representation may also include segment information 540 for each of the segments contained therein. Each segment may have a unique URL or path 542 as well as a start time 544 associated therewith. As will be described below by comparing the start times 544 with the resume point received, the proper segment may be chosen for resuming playback at another device. That is, the chosen segment or chunk that begins just prior to the resume point is chosen as the start point for the chunk.

Figure 6:
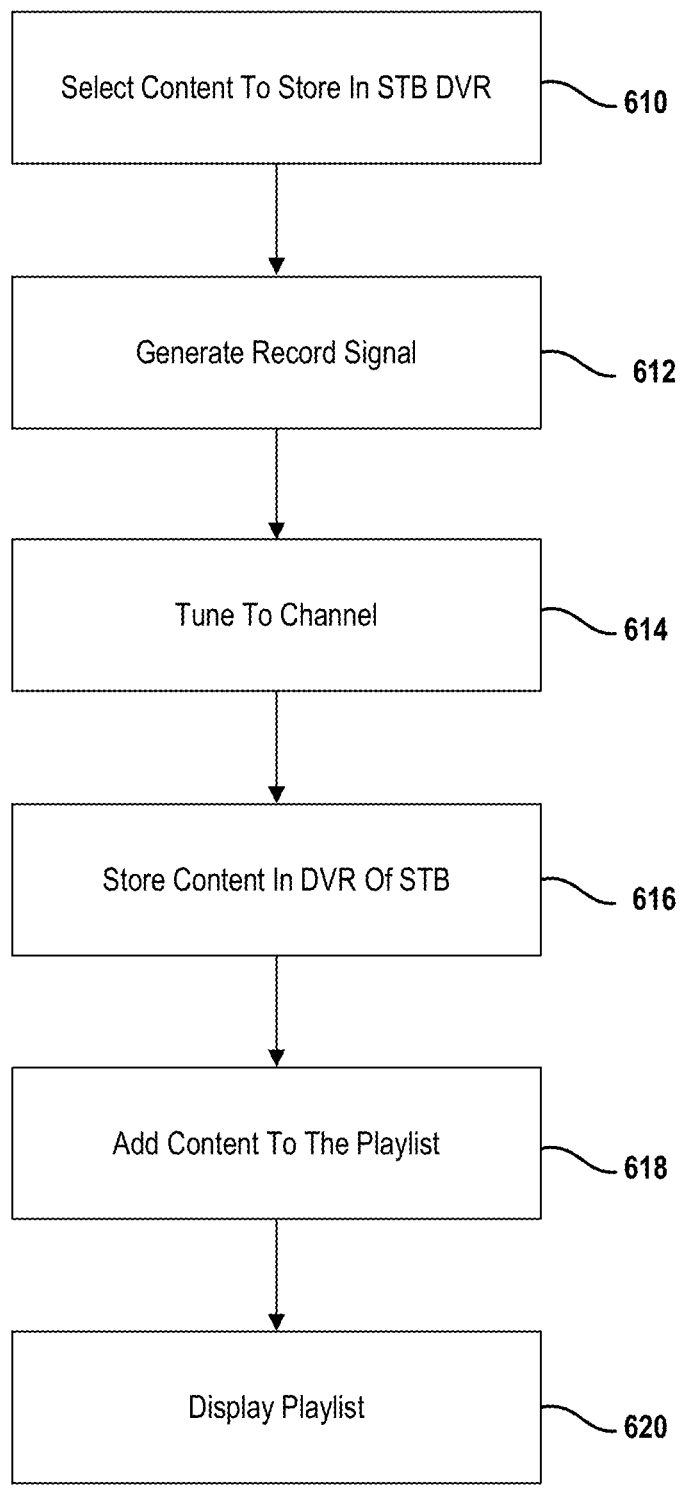
FIG. 6 is a flow chart of a method for selecting and displaying content at the set top box.

Referring now to FIG. 6, a method for storing content in a set top box is set forth. In step 610, content is selected to be stored in the set top box. The content may be selected remotely using a computer that communicates a selection to the set top box or through the set top box directly. This may be performed by viewing a program guide and selecting "record" on a remote control. The record button may also be pressed during the watching of a particular channel. In step 612 a record signal is generated at the set top box, the record signal indicates to the set top box that a recording is to be made. In step 614, the set top box may be tuned to the particular channel in response to the record signal. Content stored in the set top box may be played back during a flick action.

In step 616, the content is stored in the memory or DVR of the set top box.

In step 618, the content that is stored within the memory or the DVR within the set top box is added to a playlist. The playlist may have fully recorded content or partially recorded content therein. The playlist may be selected using a user interface.

In step 620, the playlist is displayed to a user of the set top box. The playlist may be scrolled, selected or otherwise manipulated with a user interface, such as a remote control.

Figure 7:
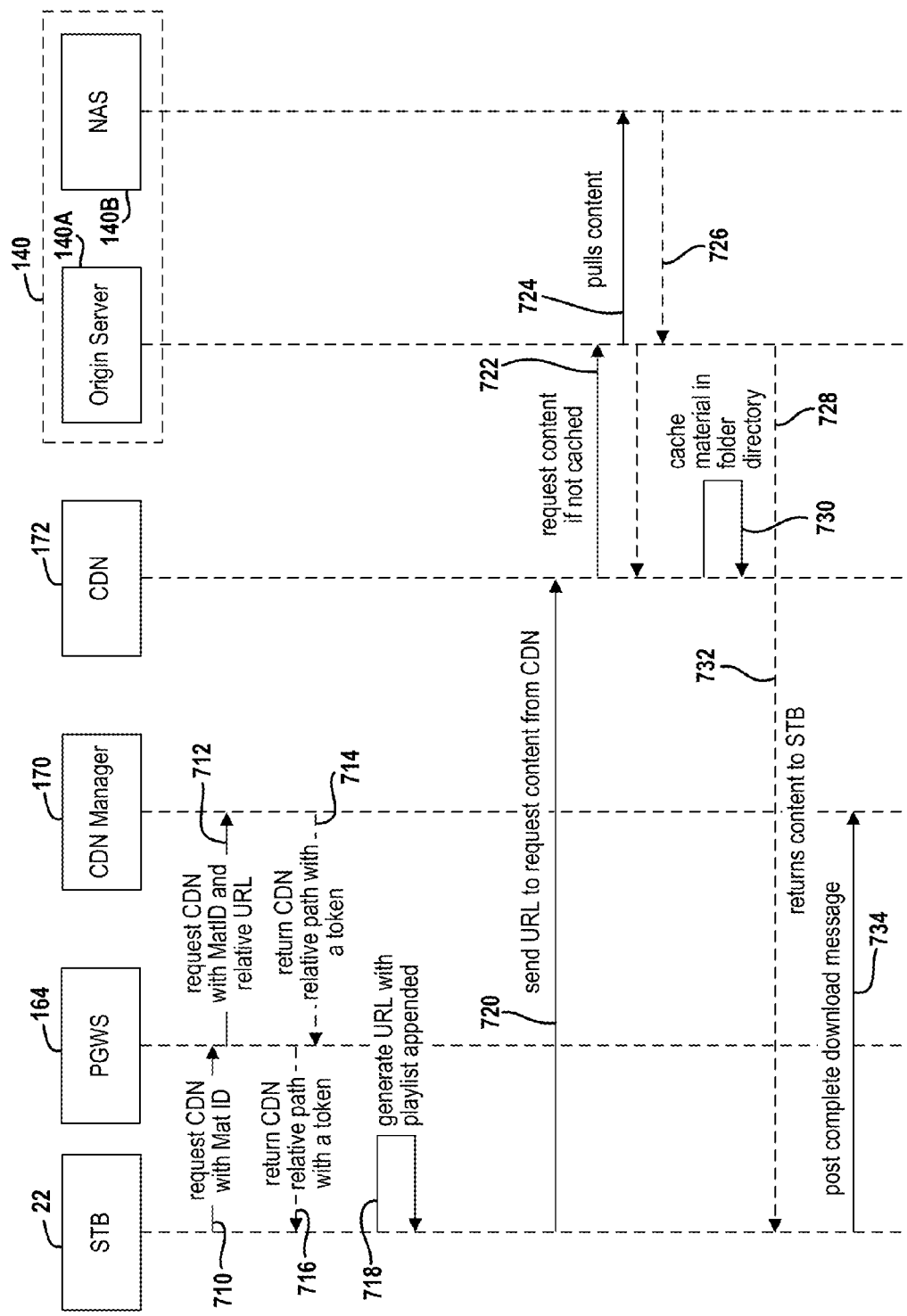
FIG. 7 is a sequence diagram of a method for requesting video on-demand content.

Referring now to FIG. 7, a sequence diagram of a method for requesting video on-demand content from a set top box is set forth. The set top box 22 generates a request for content using a material ID for the desired content in step 710. The request for content is communicated to the program guide web service 164. In particular, the request may be communicated to a particular server within the PGWS 164 that communicates with the set top box. The program guide web service 164 requests a content delivery network with a material ID and a relative path or URL in step 712. The request is communicated to the content delivery network manager 170. The content delivery network manager 170 communicates a return content delivery network, a relative path and a relative path with a token in step 714. In step 716, the return content delivery network and the relative path with the token is communicated from the program guide web service 164 to the set top box 22. A path with the playlist appended thereto may be generated in step 718.

The set top box 22 may then communicate a request from the content delivery network using the URL from step 718 in step 720. The URL or path is used to communicate to the desired content delivery network 172. The origin server 140A of the origin server/network area storage block 140 of FIG. 2 is shown as a separate element. If the origin server 140A does not have the content cached therein, step 724 pulls the content from the network area storage 140B. The content is returned to the origin server in step 726. In step 728, the content is returned to the content delivery network 172. The material may be cached in a folder directory in step 730 of the content delivery network 172. The content delivery network 172 returns content to the set top box in step 732. A complete download message may be communicated from the set top box to the content delivery network manager 170 in step 734.

Figure 8:
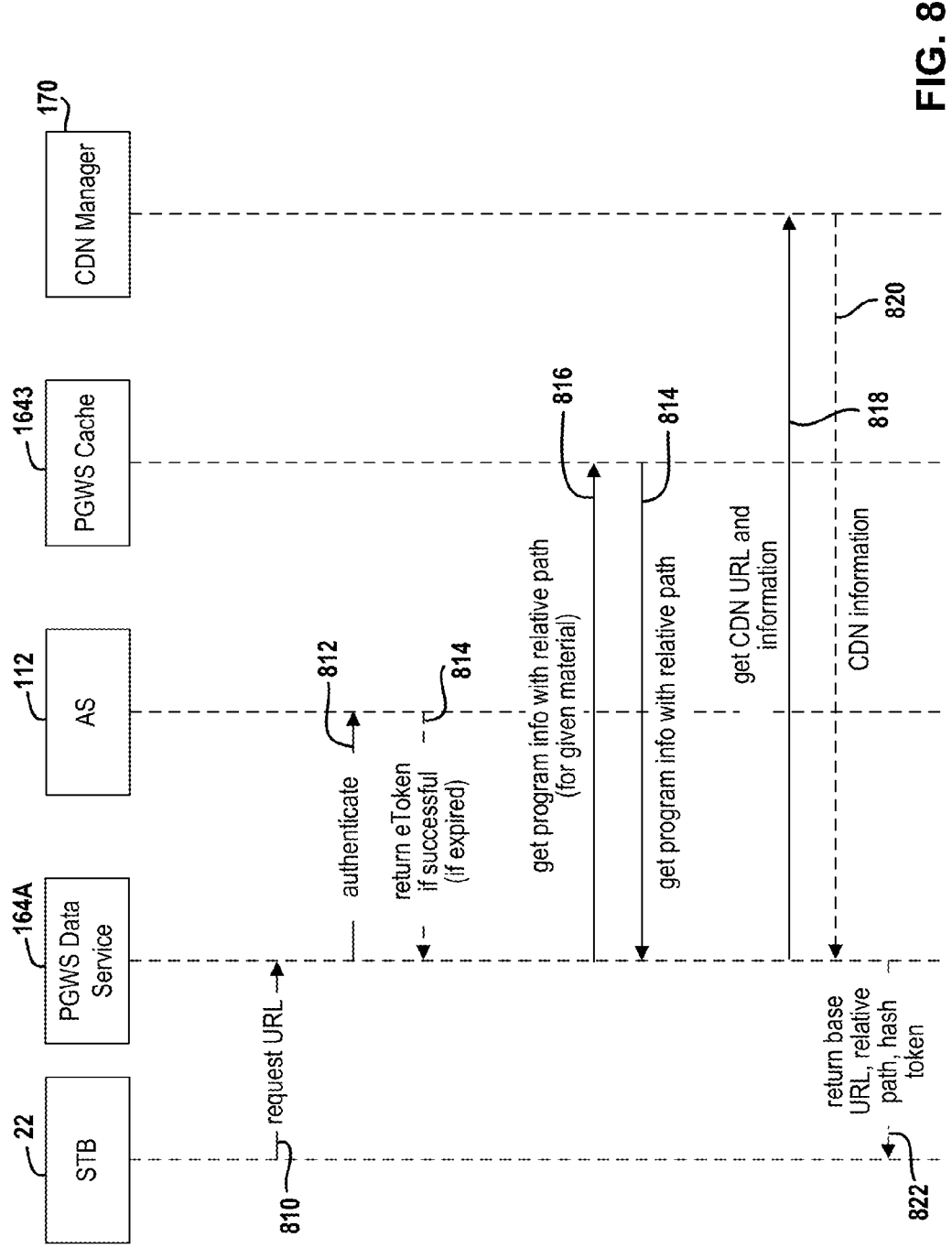
FIG. 8 is a sequence diagram of a method for requesting segmented video on-demand content that includes authentication.

Referring now to FIG. 8, a method for obtaining CDN data for segmented video on-demand content which also includes authentication. In step 810, a URL is requested from the set top box and is communicated to a program guide web service data service 164A. The program guide web service 164 as described above with respect to FIG. 2 may be broken up into different segments. The program guide web service data service 164A and the program guide web service cache 164B are used to communicate data to the set top box. Other systems or portions of the program guide web service 164 illustrated in FIG. 2 may be used to communicate with set top boxes. In this manner the proper format may be used to communicate to and from particular types of devices.

In step 812, the request for the URL is authenticated. The request of step 810 may include an electronic token that is authenticated in the authentication module 112. In step 814, a return token may be generated by the authentication server 112 when the electronic token has expired. In step 814, the program guide web service data service 164A may communicate a get program information and relative path signal to the program guide web service cache 164B. In step 816, the program information with the relative path is communicated from the program guide service cache 164B to the program guide web service 164A. The program guide web service data service 164A may also communicate a content delivery network path request to the content delivery network manager 170 in step 818. In step 820, the content delivery network information regarding the path is communicated to the program guide web service data service in step 164A. In step 822, a URL and relative path along with a hash token may be returned to the set top box so that the set top box can request the video on-demand content.

Figure 9:
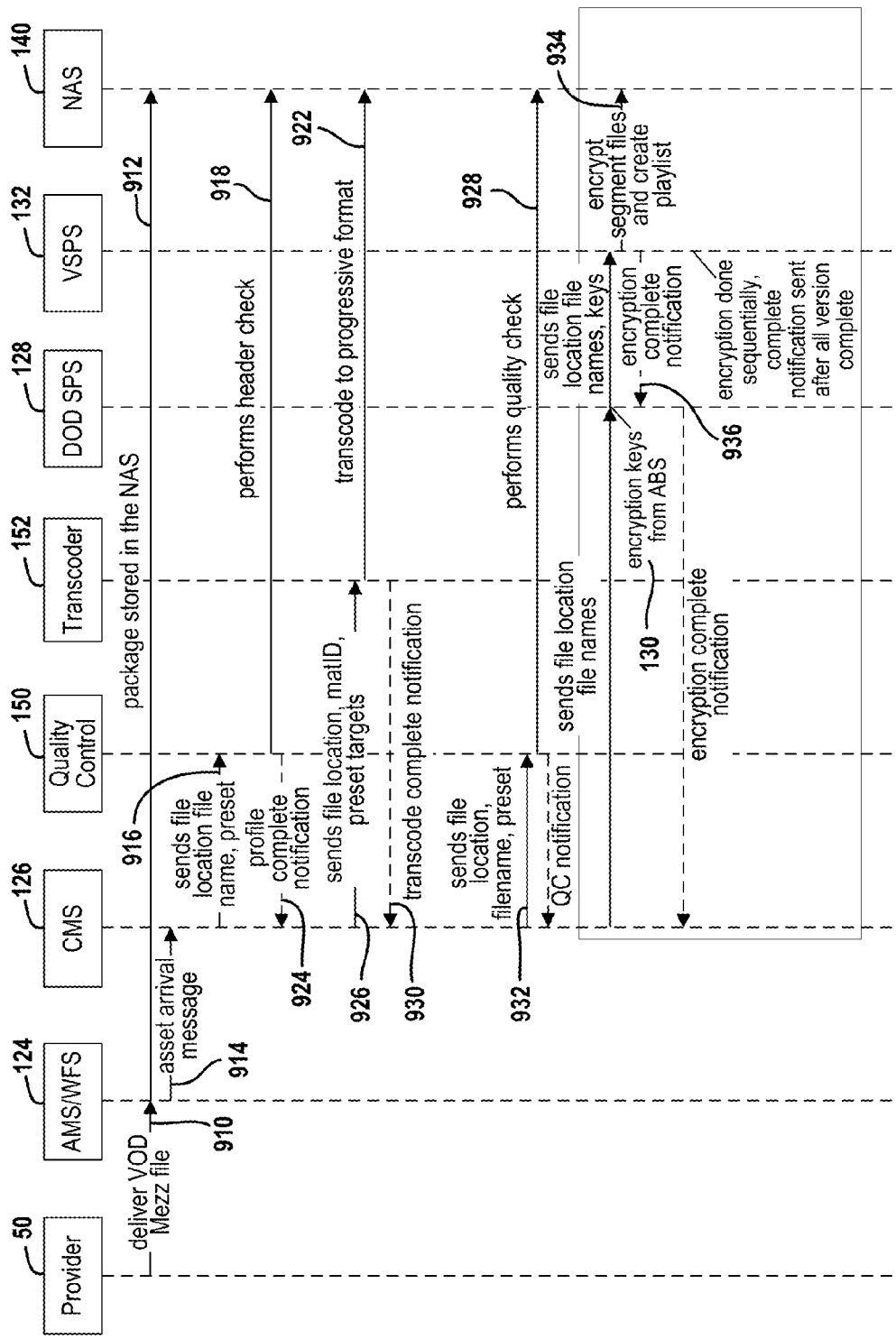
FIG. 9 is a sequence diagram for a method for processing video on-demand content in a progressive format such as the DASH format.

Referring now to FIG. 9, a method for processing content received from a provider 50 is set forth. The components correspond to those set forth in FIG. 2. In step 910, a video on-demand content mezzanine file is received from a provider at the workflow system 124. In step 912, the workflow system 124 stores the mezzanine file in the network area storage 140. In step 914, an arrival message is communicated from the workflow system to the content management system 126. The content management system 126 sends the file location, the file name and a preset to the quality control system in step 916. The quality control system performs a header check in step 918 on the content within the network area storage that restored therein in step 912. In step 920, the content management system sends a file location, a material ID and preset targets to the transcoder 152. The transcoder 152 uses the preset targets to determine what devices and what type of transcoding is required for the content. The transcoded content is communicated from the transcoder 152 to the network area storage 140. Transcoding in the transcoder 152 may take place into a progressive format. The progressive format may have the manifest file or MPD as described above with respect to FIG. 5. The transcoded content is stored in the network area storage 140 or is communicated to the network area storage 140 in step 922. In step 924, a transcode complete notification is communicated from the transcoder 152 to the content management system 126.

In step 926, a notification file, a file name and a preset is sent from the content management system 126 to the quality control system 150. The quality control system 150 performs a quality control check on the content stored in the network area storage in step 922. The quality check is performed in step 928. The quality control system 150 verifies that the content meets the specifications of the service provider, such as that of DIRECTV®, the quality control system 150 also generates a profile for the content. In step 930, the quality control notification is communicated from the quality control system to the content management system 126.

The CMS system 126 may send a file location and file names to the video stream processing system VSPS 142. Encryption keys may be provided from the conditional access system 130. The VSPS 142 may communicate encrypted content segments files and create a manifest which is stored within the network area storage 140 in step 934. In step 936, an encryption complete notification is communicated from the VSPS 142 to the SPS 128. In step 938, an encryption complete notification is communicated from the SPS to the CMS 126. Various flags may be communicated in the encryption complete notification, including a notification to the content management system not to publish the content until the encryption at the VSPS 142 is complete or to not publish the content until all of the versions have been formed.

Figure 10:
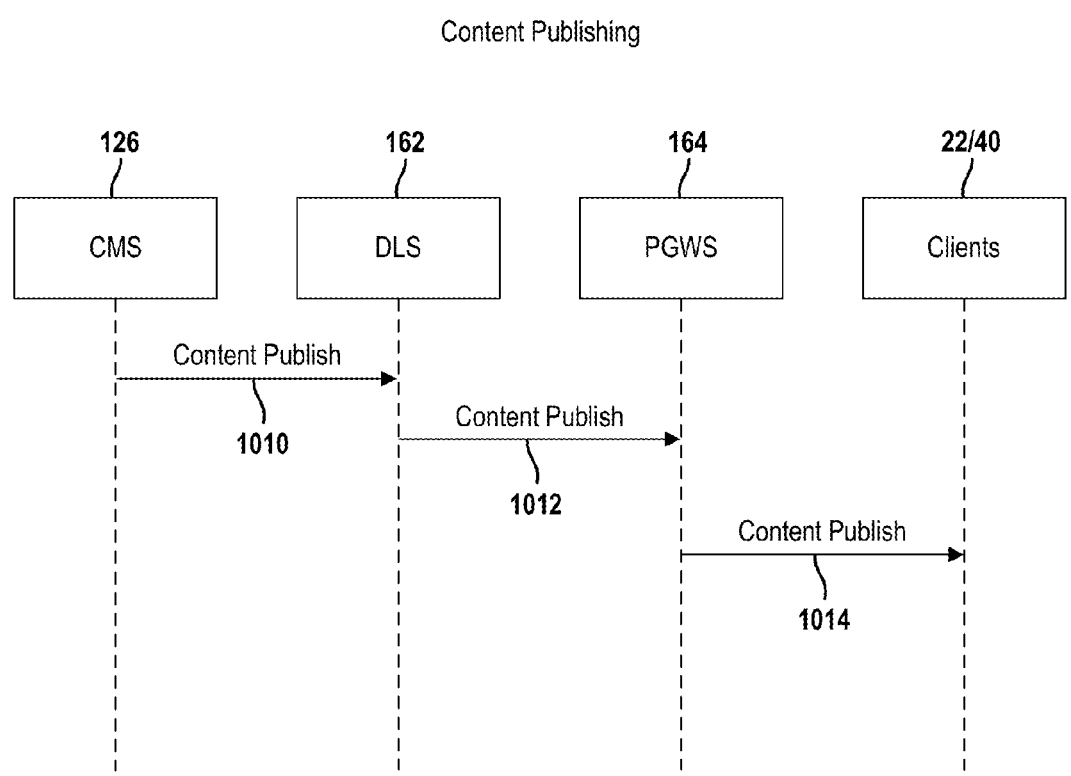
FIG. 10 is a sequence diagram for content publishing.

Referring now to FIG. 10, the content management system 126 publishes content in step 1010 to the listing system 162. The listing system 162 publishes content to the program guide web system 164, in step 1012. The program guide web system 164 may publish content to the clients 22 and 40 in step 1014.

It should be noted that the video stream processing system (VSPS) 132 may encrypt the content using the conditional access encryption key, generate metadata for trickplay, support both constant and variable bitrates and create chunk names, durations and paths for the content chunks or segments. All of the chunks may be associated with one material identification.

Figure 11:
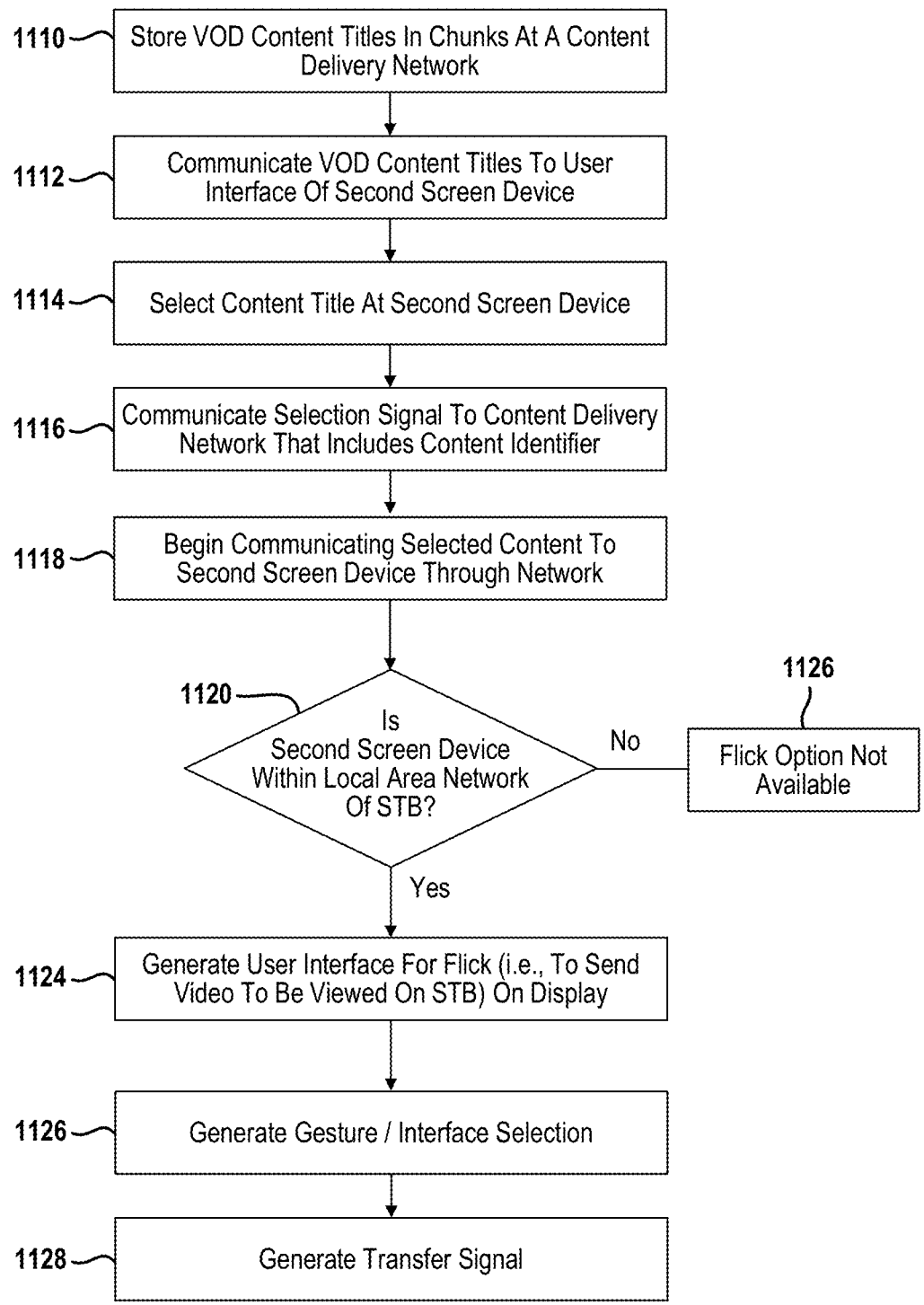
FIG. 11 is a flow chart of a method for initiating a flick function.

Referring now to FIG. 11, a method for selecting content viewed on a second screen device is set forth. In step 1110, VOD content titles are processed and stored in chunks in a network area server and associated with a content delivery network. In step 1112, the VOD content titles are communicated to a user interface of the second screen device. In step 1114, a content title is selected at a second screen device. This may be performed through a user interface or other type of selection. User interface may be displayed on a touch screen, for example. In step 1116, a selection signal is communicated to the content delivery network. The selection signal may include a content or material identifier. In step 1118, the content is communicated to a second screen device through a network. The network may include a wireless cellular phone network, alone or in combination with the internet or the like. The network speed may be used in determining the version that is ultimately sent to the second screen device through the network. In step 1120, it is determined whether the second screen device is within a local area network of a set top box, when the second screen device is not within the local area network of the set top box, step 1122 determines that a "flick" option is not available. Flick, as referred to in this document, is the ability for a given title currently playing on a second screen device to resume playing from a resume point on a set top box. If the second screen device is within a local area network of a set top box, step 1120 executes step 1124. In step 1124, a user interface for performing a "flick" is displayed on the display of the second screen device. This step may be an optional step since the flick may also be performed simply by using a gesture. The gesture is set forth in step 1126. In step 1126, a gesture may be generated or interaction with a user interface in step 1128, a transfer signal is generated. The transfer signal is an internal signal to the second screen device that initiates other processes such as the generation of query signals as set forth in FIG. 2.

Figure 12:
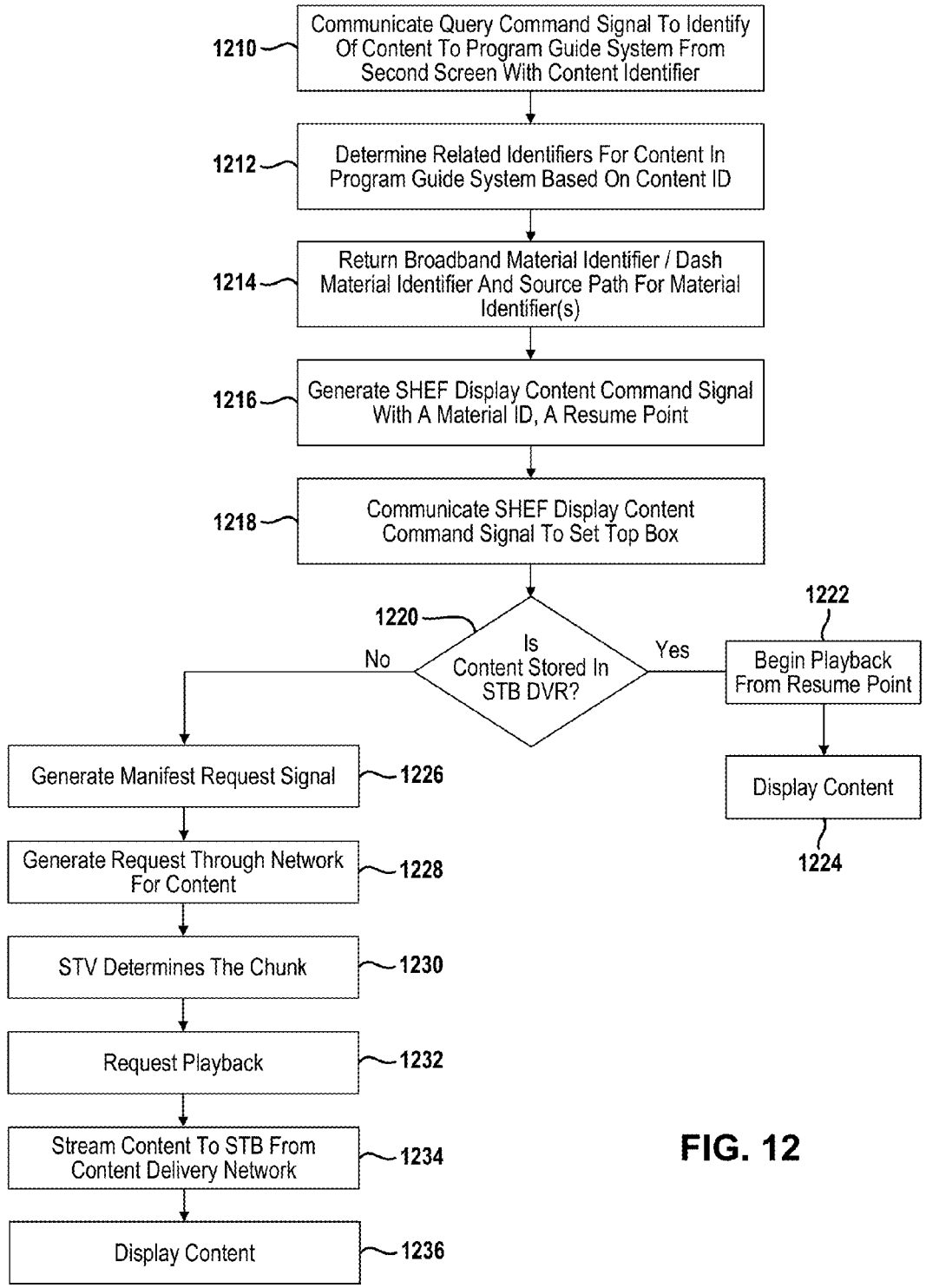
FIG. 12 is a flow chart of a method for implementing the flick function after initiation.

Referring now to FIG. 12, a continuation of the flick procedure of FIG. 1 is set forth. In step 1210, a query signal to request the identity of the content being viewed at the second screen device is communicated to the program guide web service from the second screen device. The query signal may include a content or material identifier. In response to the query signal, step 1212 determines related identifiers for content in the program guide system based on the content identifier, or material identifier. The content and other data may be communicated from the program guide web service to the second screen device in an asset data signal in step 1214. One or more material identifiers may be provided, such as a DASH material identifier and a source path for the material identifiers. In step 1216, a set top box HTTP exported functionality (SHEF) command may be generated with a material ID and a resume point that corresponds to the time that the flick was initiated. The time corresponds to the time of playback that the flick command was initiated. This time may be a time code corresponding to the actual frame being displayed or a time since the beginning of the content. The SHEF command may be referred to as a display content command signal. In step 1218, the SHEF display content command signal is communicated to the user receiving device, such as the set top box.

In step 1218, it is determined whether the content corresponding to the identifier is stored in the set top box. That is, the requested content may already be stored within the digital video recorder of the set top box as described above. This is determined in step 1220. If the content is stored within the digital video recorder of the set top box, the set top box resumes playback from the resume point by retrieving the content from the digital video recorder at the resume point in step 1222. In step 1224, content is displayed on the display associated with the set top box.

Referring back to step 1220, when the content is not stored within the set top box, step 1226 is performed. The following steps obtain streaming content to the STB. In step 1226, a manifest request signal is generated to obtain the manifest corresponding to the content identifier. In step 1228, the request for the manifest is communicated to the program guide web service. The program guide web service returns the manifest file to the set top box. In step 1230 the set top box determines the chunk or segment associated with the resume point. The manifest file also contains the path or URL of each of the chunks or segments. In step 1232, the set top box requests playback beginning from the chunk that contains the resume point in step 1232. In step 1234, content is streamed to the set top box from the content delivery network. The content delivery network begins streaming at the requested content chunk URL and subsequently returns the following chunks or segments. In step 1236, content is received and displayed on a display associated with the set top box. The resume point is used by the set top box and compared to the starting times of each of the chunks. When the resume point is between two start times, the chunk with the start time prior to the resume point is retrieved.

Figure 13:
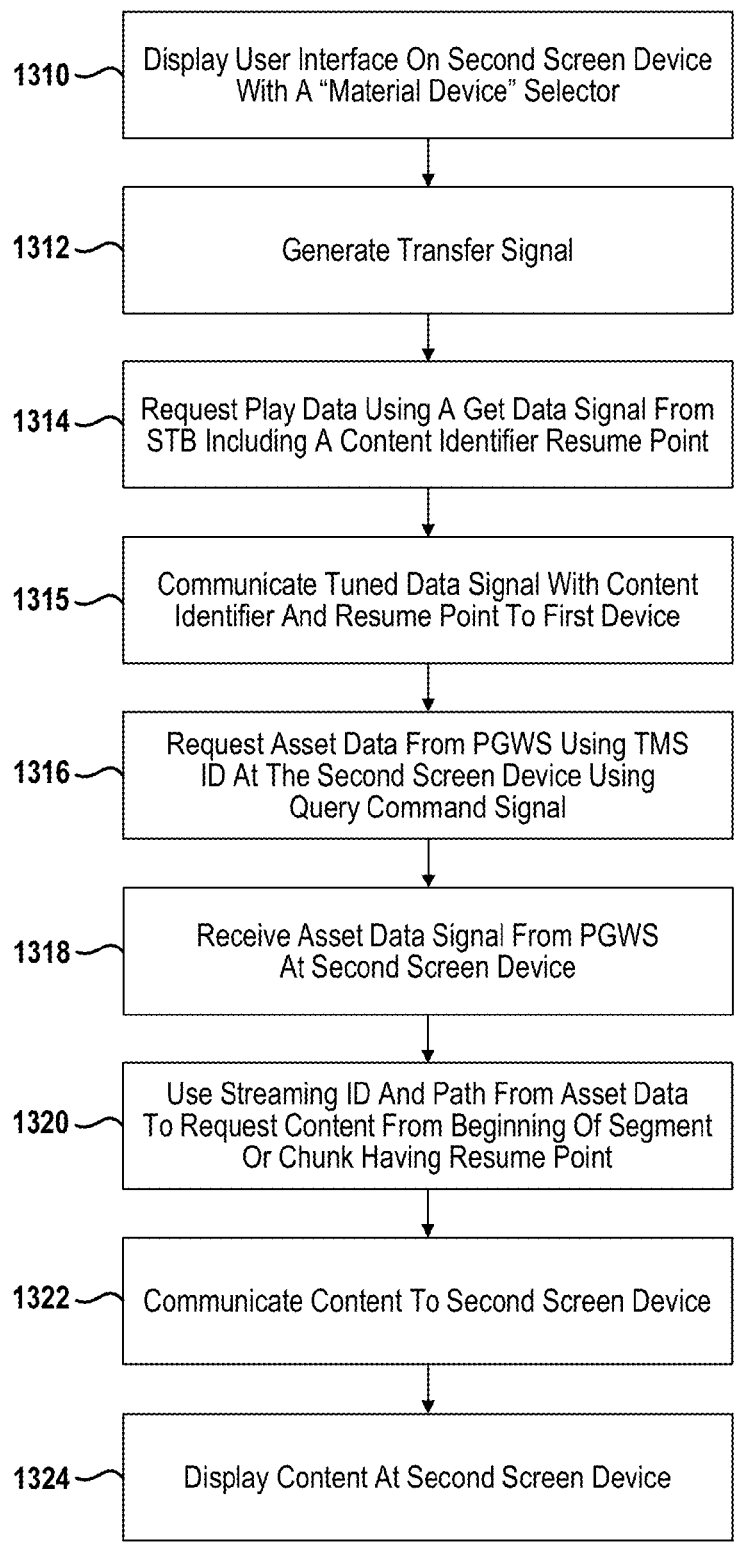
FIG. 13 is a flow chart of a method for performing the pluck feature.

Referring now to FIG. 13, the operation of the second screen device and the set top box is described with respect to a "pluck" function. A pluck, as set forth herein, refers to the procedure where a user desires the content being displayed at a display associated with the set top box to be initiated or retrieved from the IPAD® and displayed thereon. In step 1310, a user interface is displayed on a display associated with the second screen device or on the second screen device. The display may include a "watch on device" button as will be further described below in FIG. 25. In step 1312, a transfer signal is generated. The transfer signal initiates a get data signal from the set top box, including a content identifier and a resume point. It should be noted that the content identifier may already be associated with the second screen device. This is performed in step 1314. In step 1315 a tuned data signal communicates a content identifier from the set top box to the second screen device. A resume point may also be included in the tuned data signal.

In step 1316, a query command signal is used to get asset data from the program guide system or web service. This step is similar to the step set forth in step 1210 above. Other content identifiers may be obtained using the query command signal. In step 1318, an asset data signal is received from the program guide web service. The asset data signal is received at the second screen device. The asset data signal may include the path of a streamable connection to the content delivery network associated with the content identifier. That is, the content may be retrieved in a streamable format from the path returned from the program guide web service. As mentioned above, the program guide web service may communicate a request to a content delivery network to obtain the path or related identifier information. In step 1320, a streaming identifier and path that is returned from the asset data signal is used to request the content from the beginning of the chunk having the resume point therein. This is determined as mentioned above. In step 1322, content is communicated to the second screen device through a network such as the internet. In step 1324, content is displayed at the second screen device beginning at the beginning of the chunk containing the resume point.

Figure 14:
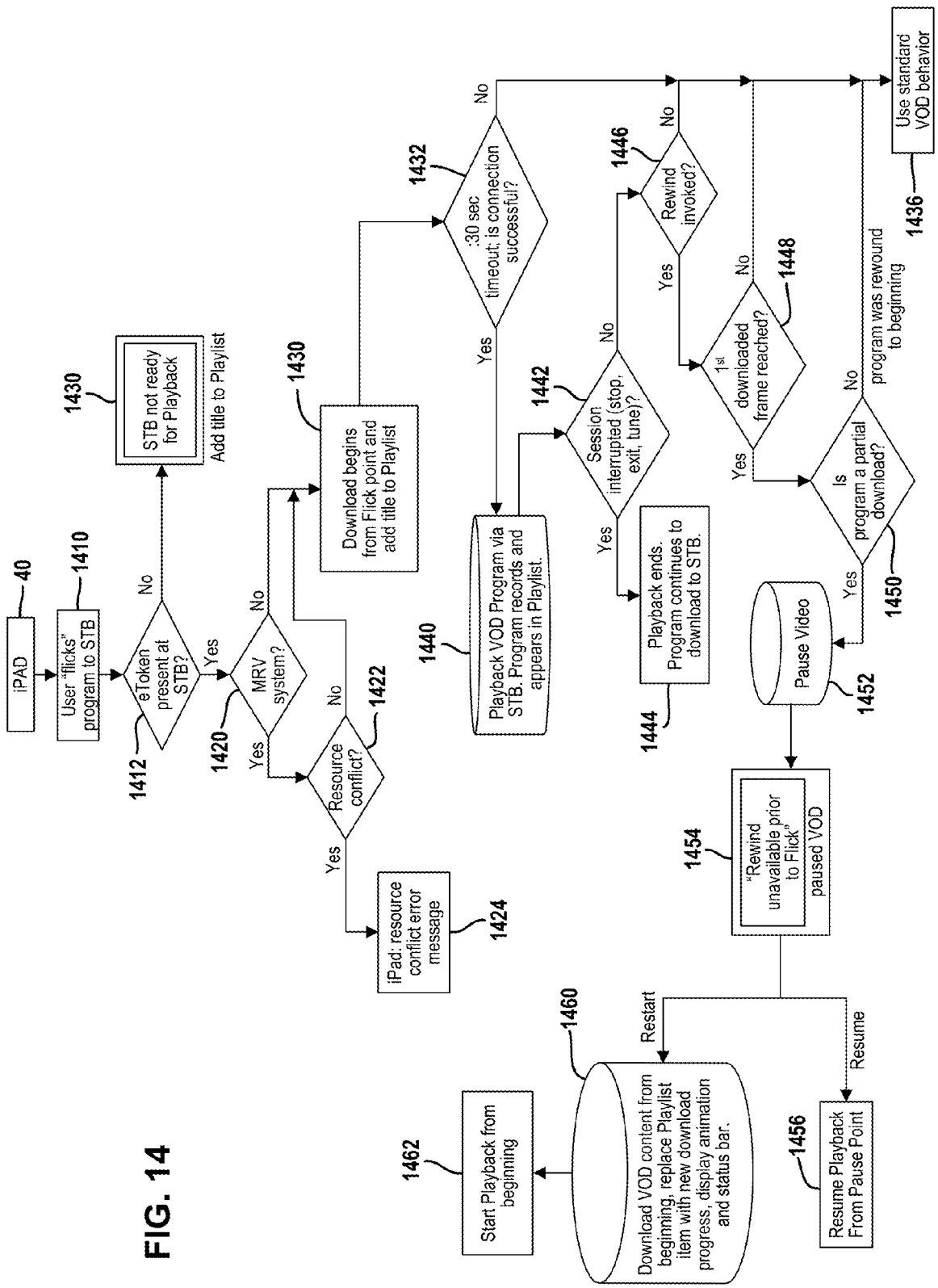
FIG. 14 is a flow chart of a method for performing a flick from the second screen device point of view.
Figure 15:
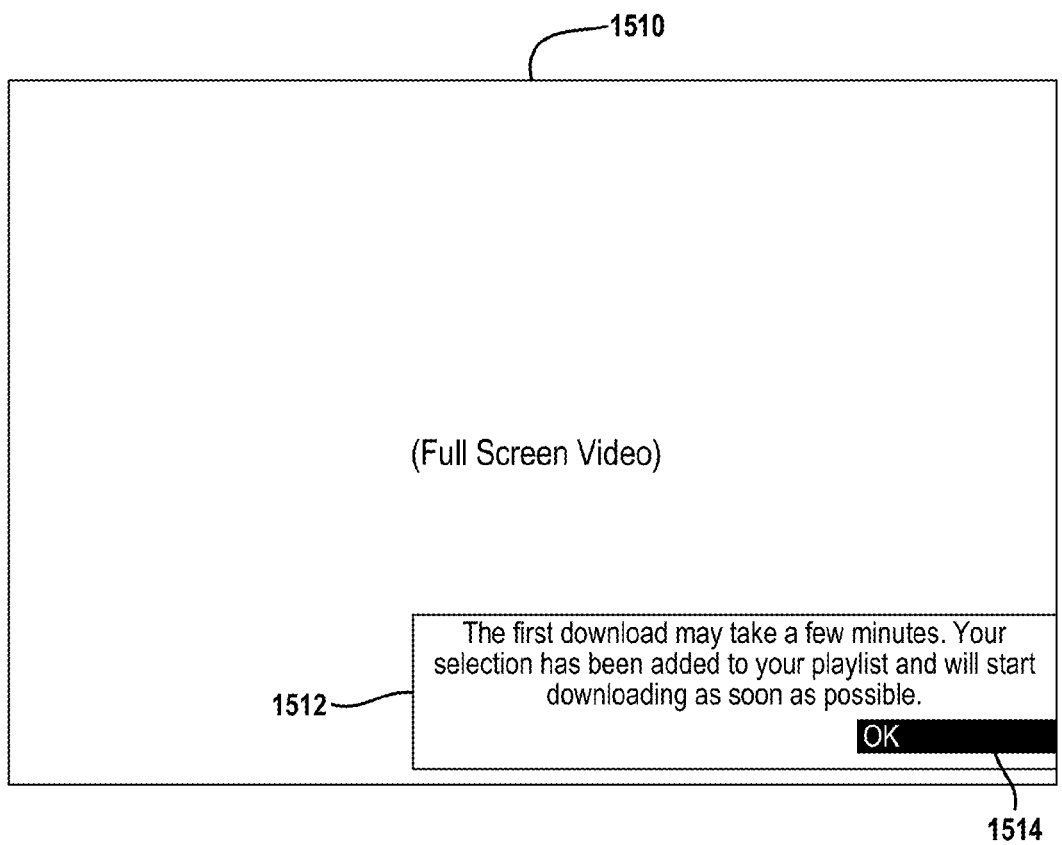
FIG. 15 is a screen display displayed when a streaming video is not yet ready to be displayed.

Referring now to FIG. 14, a flick procedure from the point of the second screen device is set forth. In step 1410, the user "flicks" a program to the set top box, this is performed as mentioned above through a user interface or performing a gesture on a touch screen surface. In step 1412, it is determined whether an eToken is present at the set top box, a screen display is displayed in step 1414. Step 1414 generates a screen display as set forth in FIG. 15, the screen display 1515 may generate a warning 1512 that indicates the download may take a few minutes and that the selection is being added to the playlist. An "ok" box 1415 may be selected to obtain the affirmation from the user of the set top box. The electronic token may be communicated to the set top box within a predetermined time for downloading the set top box application. The screen display illustrated in FIG. 15 may be displayed to allow time for the set top box to be requested by the set top box and communicated to the set top box.

In step 1412, when an eToken is present at the set top box, step 1420 determines if the set top box is within a multi-room viewing configuration. A multi-room viewing configuration has a plurality of set top boxes that are interconnected. If the system is in a multi-room viewing configuration, step 1422 determines if there is a resource conflict. If there is a resource conflict, step 1424 generates a resource conflict error. A resource conflict may take place due to the use of the set top box for other functions, such as receiving other content.

Figure 16:
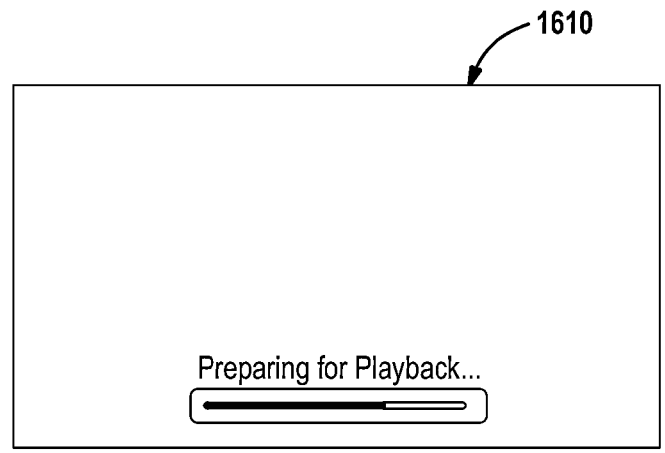
FIG. 16 is a screen display showing flick status progress.

Referring back to step 1422, if a resource conflict is not in effect with a multi-viewing system, or the system is not a multi-room viewing system in step 1420, step 1430 begins the download of the content from the flick point. And the content title is added to the playlist. The flick point, as mentioned above, may be used to determine the segment the content was in at the set top box. A screen display is illustrated in FIG. 16 as display 1610 displays a "preparing for playback message." A playback message is displayed while the content begins to download to the set top box from the resume point or the beginning of the segment containing the resume point. Further, screen display 1610 also is displayed until the content is communicated to the playlist. As briefly mentioned above, once the content is in the playlist, the content downloads until the end. If the connection is not successful in step 1432, step 1436 reverts back to the standard video on-demand behavior of the set top box.

Referring back to step 1432, if the connection is successful, step 1440 plays back the video on-demand content through the set top box. The program records and also appears in the playlist of the set top box. In step 1442, if the session is interrupted by stopping, exiting or tuning to a different channel, step 1444 ends playback. However, the system may continue to download the content to the set top box.

Figure 17:
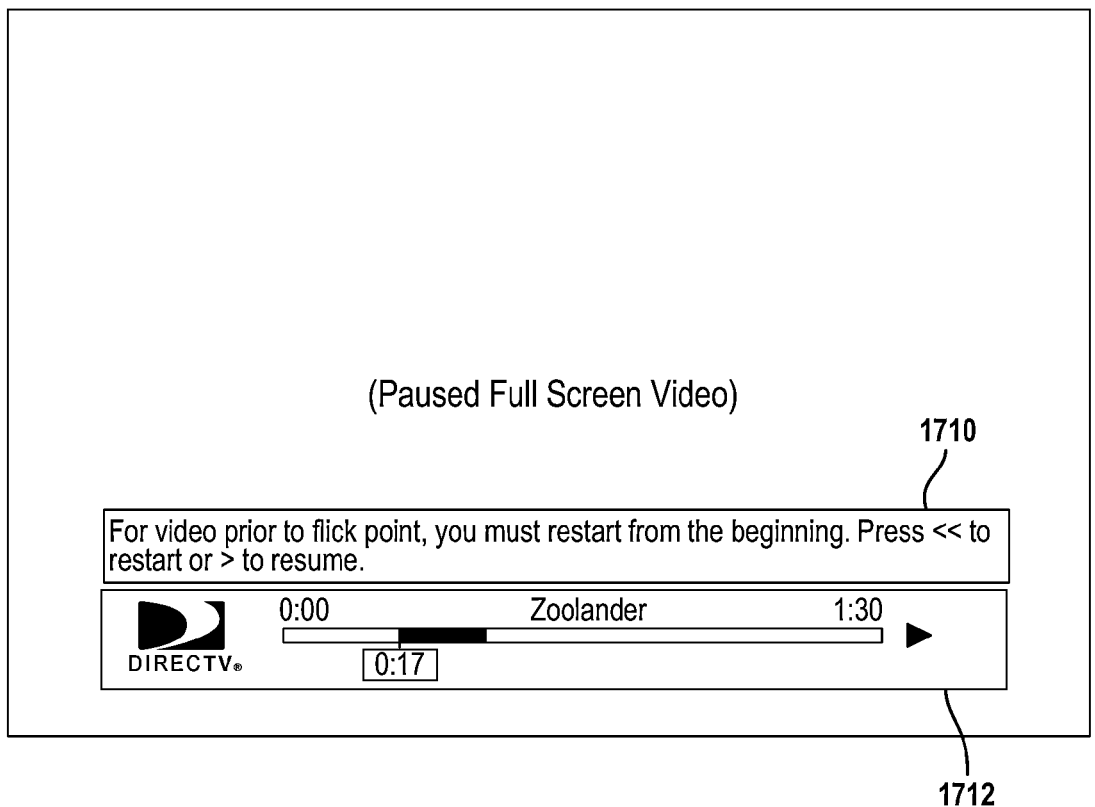
FIG. 17 is a screen display illustrating rewinding to the first downloaded segment.

In step 1442, when the session has not been interrupted and a rewind has not been invoked in step 1446, step 1436 can use the standard video on-demand behavior of the set top box. In step 1446, if a rewind has been invoked, step 1448 determines whether the first downloaded frame has been reached. If the first downloaded frame has not been reached in step 1448, step 1436 uses standard set top box behavior. In step 1448, if the first downloaded frame has been reached, step 1450 is performed. The first downloaded segment of chunk is the first downloaded frame. As mentioned above, the download is initiated at the first segment or chunk that contains the resume point. Content prior to the first downloaded chunk is not available. In step 1450, if a program is not a partial download, then step 1436 acts in a standard set top box behavior and allows rewinding to the beginning. However, if a download is a partial download in step 1450, step 1452 causes the video. In step 1454, a screen display corresponding to "a rewind being unavailable" is set forth. This is illustrated in FIG. 17. FIG. 17 generates a screen display that includes a selection box 1710 that allows the user to select "restart" or resume from the beginning. In step 1712, the progress of the content relative to the entire content is displayed. Restarting from the beginning may take some time for the content to queue. When the first frame is reached, the choices of either restarting or resuming are provided to the user. The user may select keys on the remote control to perform these functions. From the screen display of FIG. 17, when resume is selected, step 1456 resumes playback from the pause point. From step 1454, when a restart is selected at the user interface, step 1460 downloads the vide on-demand content from the beginning and replaces the playlist item with new progress and displays the animation and status bar. Step 1462 starts playing back from the beginning of the content.

Referring now to FIG. 18, a user interface 1810 is illustrated on a screen display 1820. The user interface 1810 has various selections, including "a watch to TV" selector 1812, an information selector 1814, a record selector 1816 and a share selector 1818. The "watch to TV" selector 1812 acts as a flick interface and initiates the "flick" process described above. The screen display 1820, illustrates a screen display that is used while playing back content on the second screen device. Selector 1814 may bring up further information regarding the content. The recording selector 1816 may be used to send a record command to the set top box. The share selector 1818 may be used to communicate the content to social media or generate an email.

A close box 1822 may be used to close the user interface 1810 when desired by the user.

Referring now to FIG. 19, a screen display 1910 is illustrated that is playing back content. In this example, a gesture may be generated to initiate the "flick" process for playing back the content on a set top box associated with the user device.

Referring now to FIG. 20, a screen display box 2010 may be generated on a portion of the screen display 1910 illustrated in FIG. 19 to indicate that the flick was successful and that a particular receiver is now going to playback the content.

In FIG. 21, a screen display 2110 is displayed showing the content is successfully playing back at the desired set top box.

In FIG. 22, an unsuccessful or "error" message 2210 may be displayed if a set top box is unable to process the request or the request cannot be sent to the set top box.

Figure 23:
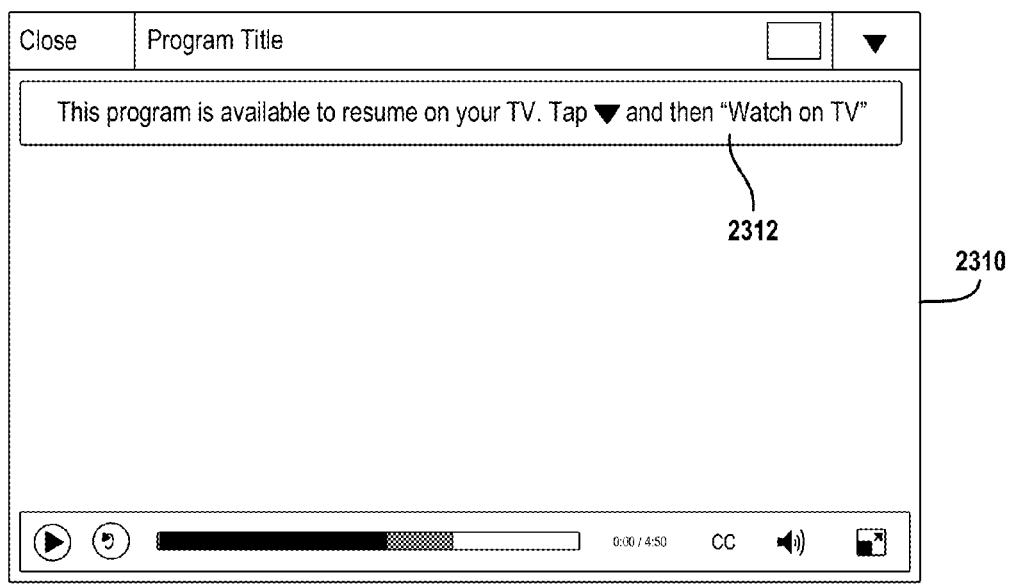
FIG. 23 is a screen display describing that a particular content is available.

Referring now to FIG. 23, a screen display 2310 is illustrated having a message 2312 displayed thereon. This message may be displayed when initially tuned to content, the second screen device is in the same network as the set top box and the set top box may be tuned to the content.

Figure 24:
FIG. 24 is a screen display illustrating a status bar during the playback of content on a display associated with the user device.

Referring now to FIG. 24, when playback of the content is begun at the set top box, a screen display 2410 is generated having a status bar 2412. The status bar shows the beginning of the content playback and the progress of the download.

Figure 25:
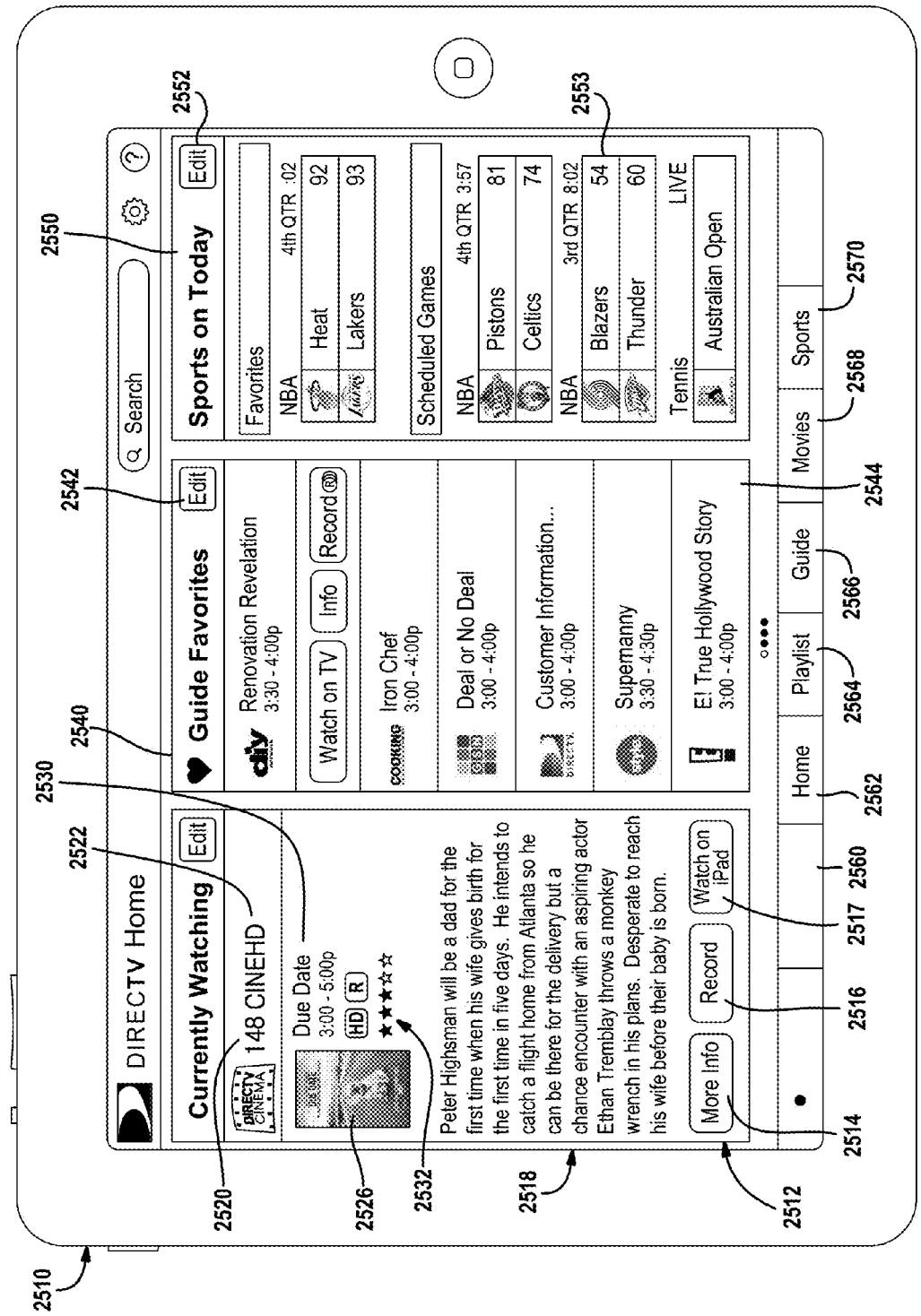
FIG. 25 is a screen display on a second screen device for illustrating a user interface for initiating a flick function.

Referring now to FIG. 25, flick functionality is illustrated in the screen display 2510. The screen display 2510 is illustrated having various modules displayed thereon. The screen display 2510 displays a homepage for DIRECTV® service referred to as DIRECTV® Home. As mentioned above, various modules may be displayed at any one time. A Currently Watching module 2512 is displayed as mentioned above. The set top box identifies to the second screen device the program currently being watched. The program being watched may be a linear broadcast or programs recorded on the set top box. An information button 2514, a record button 2516, and a "watch on IPAD®" button 2517 may also be displayed along with data in a data portion 2518. The more information button 2514 may be selected to obtain more information regarding the program currently being watched. The record button 2516 may initiate a recording sequence for scheduling recording of the current program. The "watch in IPAD®" button may be used when the second screen device is an IPAD®. Of course, other brands of second screen devices, such as ANDROID® based devices may be used. In this example, by selecting the watch on IPAD® button 2517, the pluck process may be initiated. The pluck process is described above and ultimately leads to content being streamed directly to the IPAD® based upon the resume point communicated to the second screen device. Other data that may be displayed are the channel number 2520, the channel name 2522, and an image 2526 corresponding to the current program. A title and time section 2530 may also be used. A ratings indicator 2532 may also be displayed.

Another module is a guide listing module v. In the present example, the guide listing module is displaying guide favorites (favorite channel listings). The guide favorites may be user-selected using the edit button 2542. The edit button may be used to select the favorite channels. The edit buttons may also be used to select the favorite programs, or pre-canned lists like news, programs and children's programs. In this example, guide favorites are displayed for a predetermined channel in a channel module box 2544. When a channel module box is selected using the user interface such as the touch screen, further information and details about the particular channel or program may be displayed within the guide listing module 2540. Recording options may also be provided when further details is displayed.

Another module is a sports module 2550. The sports module 2550 may be configured in various manners according to user selections by using the edit box 2552. The sports module 2550 may generate sports scores for current events as well as listings for future events. By selecting any one of the sports boxes 2552, further information may be obtained by the second screen device. A recording box may also be provided after further information is displayed. The sports module 2550 may have scores updated after a predetermined amount of time. For example, the sports may be updated every 45 seconds. Of course, only sports scores with a start time of the current day are updated.

A plurality of tabs 2560-2570 may be provided at the bottom of the screen display of the second screen device. A remote tab 2560 may be selected for a touch screen remote control to be displayed on the display. A home tab 2562 may be selected to display the homepage with the user's selection of modules. Default settings may be provided for first-time users. The screen display 2510 illustrates the home selection. The playlist tab 2564 displays the playlist of the digital video recorder within the set top box. The playlist is a compilation of all of the content recorded on the set top box. Some of these functions will be described further below.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   displaying first video content on a first display associated with a set top box, said first video content having a first content identifier associated therewith, said first content identifier corresponding to a non-streamable broadcast format;
   forming a transfer signal at a first device by generating a gesture or selecting a selector at a user interface at the first device;
   determining, at the set top box, a resume point, said resume point corresponding to a playback position of the first video content being displayed at about a time of generating the transfer signal;
   communicating the resume point from the set top box to the first device;
   forming, at the first device, a query command signal comprising the first content identifier in response to the transfer signal;
   communicating the query command signal from the first device to a program guide web service separate from the first device and the set top box;
   receiving, at the first device, an asset data signal comprising at least a second content identifier of a second video content corresponding to a streamable format of the first video content from the program guide web service in response to the query command signal, said second content identifier related to the first content identifier;
   requesting the second video content based on the second content identifier and the resume point; and
   displaying the second video content on a second display.

2. The method as recited in claim 1 wherein requesting the second video content comprises:
   requesting a manifest from the program guide web service using a manifest request signal;
   receiving a manifest at the first device comprising a segment path for a plurality of segments;
   determining a resume segment based on the resume point based on the manifest; and
   requesting the resume segment from the first device.

3. The method as recited in claim 2 wherein displaying second video content comprises displaying the second video content beginning at the beginning of the resume segment and displaying subsequent segments.

4. The method as recited in claim 1 wherein determining the resume point comprises communicating a get data signal to the set top box, and receiving a tuned data signal at the first device comprising the resume point.

5. The method as recited in claim 1 wherein requesting the second video content comprises requesting a manifest from the web service using a manifest request signal;
   receiving the manifest at the first device comprising a segment path for a plurality of segments;
   determining a resume segment based on the resume point using the manifest; and
   requesting the resume segment.

6. The method as recited in claim 5 wherein displaying comprises displaying the second video content beginning at the beginning of the resume segment and displaying subsequent segments.

7. The method as recited in claim 1 wherein displaying comprises displaying the second video content on the second display associated with the first device.

8. A system comprising:
   a set top box;
   a first display associated with the set top box displaying first video content, said first video content having a first content identifier associated therewith, said first content identifier corresponding to a non-streamable broadcast format;
   a first device forming a transfer signal by generating a gesture or selecting a selector at a user interface and communicating the transfer signal to the set top box;
   said set top box determining a resume point in response to the transfer signal and communicating the resume point to the first device;
   said first device communicating a query command signal comprising the first content identifier in response to the transfer signal to a program guide web service separate from the first device;
   said first device receiving an asset data signal comprising at least a second content identifier of a second video content corresponding to a streamable format of the first video content from the program guide web service in response to the query command signal;
   the first device requesting second video content corresponding to the video content based on the second identifier and a resume point, said resume point corresponding to a playback position of the video content being displayed at about a time of generating the transfer signal; and a second display associated with the first device displaying the second video content.

9. The system as recited in claim 8 wherein the first device requests a manifest from the program guide web service using a manifest request signal, said first device receives the manifest comprising a segment path for a plurality of segments;

wherein said first device determines a resume segment based on the resume point using the manifest and requests the resume segment.

10. The system as recited in claim 9 wherein the first device displays the second video content beginning at the beginning of the resume segment and displays subsequent segments.

11. The system as recited in claim 8 wherein the first device communicates a get data signal to the set top box, and receives a tuned data signal at the first device comprising the resume point.

12. The system as recited in claim 8 wherein the set top box communicates the first content identifier to the first device.

13. The system as recited in claim 8 wherein the first device requests a manifest from the web service using a manifest request signal and receives the manifest comprising a segment path for a plurality of segments;

said first device determines a resume segment based on the resume point using the manifest and requests the resume segment.

14. The system as recited in claim 13 wherein the second display displays the second video content beginning at the beginning of the resume segment and displays subsequent segments.

* * * * *